US012730451B2

(12) United States Patent
Richert

(10) Patent No.: US 12,730,451 B2
(45) Date of Patent: Sep. 8, 2026

(54) SYSTEMS AND METHODS FOR DETERMINING POSITION ERRORS OF FRONT HAZARD SENSORS ON ROBOTS

(71) Applicant: Brain Corporation, San Diego, CA (US)

(72) Inventor: Micah Richert, San Diego, CA (US)

(73) Assignee: Brain Corporation, San Diego, CA (US)

( * ) Notice: Subject to any disclaimer, the term of this patent is extended or adjusted under 35 U.S.C. 154(b) by 405 days.

(21) Appl. No.: 18/128,337

(22) Filed: Mar. 30, 2023

(65) Prior Publication Data

US 2023/0236607 A1 Jul. 27, 2023

Related U.S. Application Data

(63) Continuation of application No. PCT/US2021/053875, filed on Oct. 7, 2021.

(60) Provisional application No. 63/088,583, filed on Oct. 7, 2020.

(51) Int. Cl.
*G05D 1/00* (2024.01)

(52) U.S. Cl.
CPC .................................. *G05D 1/0274* (2013.01)

(58) Field of Classification Search
CPC .. G05D 1/0274; G05D 1/0248; G05D 1/0251; G05D 1/0272; G05D 1/024; G05D 1/0234; G05D 1/0231; G05D 1/0257; G06V 10/764; G06V 20/176; H04W 4/38
USPC ...... 73/1.01, 1.75, 1.79, 1.88; 700/245, 254, 700/251, 253, 258, 259, 261; 702/85, 702/150, 188, 155, 141, 94, 153, 152, 702/189, 127, 158, 151, 159, 105, 86, 87, 702/104, 166, 145; 901/1, 46, 2, 47
See application file for complete search history.

(56) References Cited

U.S. PATENT DOCUMENTS

| | | | |
|---|---|---|---|
| 5,111,401 | A | 5/1992 | Everett, Jr. et al. |
| 5,696,675 | A | 12/1997 | Nakamura et al. |
| 5,758,298 | A | 5/1998 | Guldner |
| 5,793,900 | A | 8/1998 | Nourbakhsh et al. |
| 5,793,934 | A | 8/1998 | Bauer |
| 6,667,592 | B2 | 12/2003 | Jacobs et al. |

(Continued)

FOREIGN PATENT DOCUMENTS

| | | | | |
|---|---|---|---|---|
| CA | 2886106 | A1 * | 7/2014 | .......... A47L 11/4011 |
| CN | 104299244 | B * | 7/2017 | ............ G06T 7/215 |

(Continued)

OTHER PUBLICATIONS

International Search Report and Written Opinion for PCT/US21/53875 dated Jan. 11, 2022.

(Continued)

*Primary Examiner* — Arleen M Vazquez
*Assistant Examiner* — Denise R Karavias
(74) *Attorney, Agent, or Firm* — Pierson Ferdinand LLP; Sidharth Kapoor

(57) ABSTRACT

Systems and methods for detecting an error in the mounting of a front hazard sensor are disclosed herein. According to at least one exemplary embodiment, an error in a pose of a front hazard sensor may comprise the front hazard sensor being orientated or positioned incorrectly with respect to a default pose. The present disclosure provides systems and methods for determining if this error in the pose is present.

12 Claims, 12 Drawing Sheets

(56) References Cited

U.S. PATENT DOCUMENTS

| | | | |
|---|---|---|---|
| 7,170,252 | B2 | 1/2007 | Maeki |
| 7,502,065 | B2 | 3/2009 | Nakahara |
| 7,965,890 | B2 | 6/2011 | Marcus et al. |
| 8,185,239 | B2 | 5/2012 | Teng et al. |
| 8,300,890 | B1 | 10/2012 | Gaikwad et al. |
| 8,542,875 | B2 | 9/2013 | Eswara |
| 8,903,589 | B2 | 12/2014 | Sofman et al. |
| 8,918,241 | B2 | 12/2014 | Chen et al. |
| 8,948,913 | B2 | 2/2015 | Choi et al. |
| 8,954,191 | B2 | 2/2015 | Yi et al. |
| 9,076,214 | B2 | 7/2015 | Tsutsumi |
| 9,122,948 | B1 | 9/2015 | Zhu et al. |
| 9,174,672 | B2 | 11/2015 | Zeng et al. |
| 9,192,869 | B2 | 11/2015 | Moriya |
| 9,208,384 | B2 | 12/2015 | Conwell et al. |
| 9,216,745 | B2 | 12/2015 | Beardsley et al. |
| 9,233,472 | B2 | 1/2016 | Angle et al. |
| 9,286,810 | B2 | 3/2016 | Eade et al. |
| 9,304,001 | B2 | 4/2016 | Park et al. |
| 9,380,922 | B2 | 7/2016 | Duffley et al. |
| 9,400,501 | B2 | 7/2016 | Schnittman |
| 9,404,756 | B2 | 8/2016 | Fong et al. |
| 9,519,289 | B2 | 12/2016 | Munich et al. |
| 9,534,899 | B2 | 1/2017 | Gutmann et al. |
| 9,538,892 | B2 | 1/2017 | Fong et al. |
| 9,864,377 | B2 | 1/2018 | Welty et al. |
| 9,910,444 | B2 | 3/2018 | Eade et al. |
| 9,952,053 | B2 | 4/2018 | Fong et al. |
| 10,093,021 | B2 | 10/2018 | Aghamohammadi et al. |
| 10,209,063 | B2 | 2/2019 | Anderson-Sprecher |
| 10,383,497 | B2 | 8/2019 | Han et al. |
| 10,667,664 | B2 | 6/2020 | Sheikh et al. |
| 11,481,918 | B1 * | 10/2022 | Ebrahimi Afrouzi ........................ A47L 11/4008 |
| 11,927,965 | B2 | 3/2024 | Ebrahimi Afrouzi et al. |
| 2004/0117079 | A1 | 6/2004 | Hulden |
| 2006/0188168 | A1 | 8/2006 | Sheraizin et al. |
| 2008/0059015 | A1 | 3/2008 | Whittaker et al. |
| 2008/0294338 | A1 | 11/2008 | Doh et al. |
| 2012/0121161 | A1 | 5/2012 | Eade et al. |
| 2014/0207282 | A1 * | 7/2014 | Angle .................... B25J 13/006 901/1 |
| 2015/0205299 | A1 * | 7/2015 | Schnittman .......... G05D 1/0227 901/1 |
| 2015/0261223 | A1 | 9/2015 | Fong et al. |
| 2017/0197315 | A1 * | 7/2017 | Haegermarck ...... G05D 1/0248 |
| 2019/0196493 | A1 * | 6/2019 | Xiong ....................... G06T 7/74 |
| 2020/0225673 | A1 * | 7/2020 | Ebrahimi Afrouzi ........................ A47L 11/4011 |
| 2022/0066456 | A1 * | 3/2022 | Ebrahimi Afrouzi ........................ G06F 3/04883 |

FOREIGN PATENT DOCUMENTS

| | | | |
|---|---|---|---|
| EP | 1240562 | B1 | 6/2004 |
| EP | 2343615 | B1 | 10/2018 |
| JP | 3265212 | B2 | 3/2002 |
| JP | 2009216600 | A | 9/2009 |
| JP | 2009288930 | A | 12/2009 |
| JP | 5769455 | B2 | 8/2015 |
| KR | 10-2010-0027683 | A | 3/2010 |
| KR | 101048098 | B1 | 7/2011 |
| WO | 2011146259 | A2 | 11/2011 |
| WO | 2020010043 | A1 | 1/2020 |

OTHER PUBLICATIONS

Basic Research Series: Optical Information Technology State-of-the-Art Report; Publication date 1993.

Bernard Feverjon et al., A local based approach for path planning of manipulators with a high number of degrees of freedom. Proceedings. 1987 IEEE International Conference on Robotics and Automation 4 (1987): 1152-1159.

Brett R. Fajen et al., A Dynamical Model of Visually-Guided Steering, Obstacle Avoidance, and Route Selection. International Journal of Computer Vision 54 (2003): 13-34.

Christoph Rosmann et al., Efficient Trajectory Optimization Using a Spares Model. 2013 Eur. Conf. on Mobile Robots; Sep. 2013.

Dave Ferguson et al., Planning Long Dynamically Feasible Maneuvers for Autonomous Vehicles, Int'l J. of Robotics Research, vol. 28(8); Jun. 26, 2009.

David G. Lowe, Object Recognition from Local Scale-Invariant Features; 1999.

Dieter Fox et al., The Dynamic Window Approach to Collision Avoidance, IEEE Robotics and Automation Magazine, vol. 4(1); Apr. 1997.

Francisco Amoros et al., Global Appearance Applied to Visual Map Building and Path Estimation Using Multiscale Analysis, Hindawi Publishing Corporation, Mathematical Problems in Engineering, vol. 2014 Article ID 365417; Jul. 22, 2014.

Gany Berkovic and Ehud Shafir, Optical Methods for Distance and Displacement Measurements; Sep. 11, 2012.

Handbook of Optical Systems, vol. 4: Survey of Optical Instruments; 2008.

Hani Safadi, Local Path Planning Using Virtual Potential Field, McGill University School of Computer Science; Apr. 18, 2007.

J.M. Rueger, Electronic Distance Measurement, 3rd Ed.; 1990.

J.M. Rueger, Electronic Distance Measurement, 4th Ed.; 1996.

Kazushi Nakazawa et al., Movement Control of Accompanying Robot Based on Artificial Potential Field Adapted to Dynamic Environments, Elec. Engin. in Japan, vol. 192; Feb. 2014.

Khalid Yousif et al., An Overview to Visual Odometry and Visual SLAM: Applications to Mobile Robotics, Intell. Ind. Syst. vol. 1, 289; Nov. 13, 2015.

Laurent Itti, Christof Koch, and Ernst Niebur, A Model of Saliency-Based Visual Attention for Rapid Scene Analysis; Nov. 1998.

Lina J. Karam, Nabil G. Sadaka, Rony Ferzli, and Zoran A. Ivanovski, An Efficient Selective Perceptual-Based Super-Resolution Estimator; Dec. 2011.

Lu and Milios, Globally Consistent Range Scan Alignment for Environment Mapping, Autonomous robots, 4 Autonomous robots 333-49 (1997).

Lu Yin et al., A New Potential Field Method for Mobile Robot Path Planning in the Dynamic Environments, Asian J. of Conti ol vol. 11(2); Mar. 2009.

Matthias Nieuwenhuisen et al., Predictive Potential Field-Based Collision Avoidance for Multicopters, Remote Sensing and Spatial Information Sciences, vol. XL-1; Sep. 4, 2013.

Mejdl Safran and Steven Haar, Arduino and Android Powered Object Tracking Robot; Nov. 27, 2012.

Oscar Montiel et al., Optimal Path Planning Generation for Mobile Robots Using Parallel Evolutionary Artificial Potential Field, J. Intell. Robot Sys.; Sep. 20, 2014.

Oussama Khatib, Real-Time Obstacle Avoidance for Manipulators and Mobile Robots Int'l J. of Robotics Research, vol. 5(1); 1986.

P. Payeur, Improving Robot Path Planning Efficiency with Probabilistic Virtual Environment Models. IEEE Int'l Conf. on Virtual Environments; Jul. 2004.

Peter Biber and Wolfgang StraBer, nScan-Matching: Simultaneous Matching of Multiple Scans and Application to SLAM, Proceedings 2006 IEEE International Conference on Robotics and Automation, 2006.

Pierre Melchior et al., Robust Path Planning for Mobile Robot Based on Fractional Attractive Force. 2009 American Control Conf.; Jun. 2009.

Qian Jia & Xingsong Wang, An Improved Potential Field Method for Path Planning, 2010 Chinese Control and Decision Conference; 2010.

Qian Xu, Chaitali Chakrabarti, and Lina J. Karam, A Distributed Canny Edge Detector and its Implementation on FGPA; 2011.

Sean Quinlan & Oussama Khatib, Elastic Bands: Connecting Path Planning and Control, IEEE Int'l Conference on Robotics and Automation; 1998.

Srenivas Varadarajan and Lina J. Karam, An Improved Perception-Based No-Reference Objective Image Sharpness Metric Using Iterative Edge Refinement; 2008.

(56) References Cited

OTHER PUBLICATIONS

Srenivas Varadarajan, Chaitali Chakrabarti, Lina J. Karam, and Judit Maitinez Bauza, A Distributed Psycho—Visually Motivated Canny Edge Detector; 2010.
Srenivas Varadarajan, Lina J. Karam, and Dinei Florencio, Background Recovery from Video Sequences Using Motion Parameters; 2009.
Stachniss et al., Springer Handbook of Robotics, Chapter 46: Simultaneous Localization and Mapping, Springer (2d ed.); Jan. 1, 2016.
Prassler et al., Springer Handbook of Robotics, Chapter 65: Domestic Robots, Springer (2d ed.); Jan. 1, 2016.
Suzuki and Abe, Topological Structural Analysis of Digitized Binary Images by Border Following; 1983.
Wang Tianmiao et al., Mobile Robot Control Based on Dynamic Potential, Chinese J. of Sys. Engin. & Elec. vol. 3; Mar. 31, 1992.
Ya-Chun Chang & Yoshio Yamamoto, Path Planning of Wheeled Mobile Robot with Simultaneous Free Space Locating Capability, Int'l Serv. Robotics; Nov. 25, 2008.
Yong K. Hwang & Narenda Ahuja, A Potential Field Approach to Path Planning, IEEE Transactions on Robotics and Automation vol. 8(1); Feb. 1992.
Wolfgang Hess et al., Real-time loop closure in 2D Lidar Slam, 2016 IEEE International Conference on Robotics and Automation; May 16-21, 2016.
Zhenyu Wu et al., Collision Avoidance for Mobile Robots Based on Artificial Potential Field and Obstacle Envelope Modelling, Assembly Automation, vol. 36(3); Aug. 1, 2016.
Kaiqi Huang, Liangsheng Wang, Tieniu Tan, and Steve Maybank, A Real-Time Object Detecting and Tracking System for Outdoor Night Surveillance; 2008.
Subramanian Saravankumar et al., Multipoint potential field method for path planning of autonomous underwater vehicles in 3D space, Intel Serv Robots 2013; Oct. 6, 2013.
Javier Minguez et al., Abstracting Vehicle Shape and Kinematic Constraints from Obstacle Avoidance Methods, Autonomous Robots, vol. 20(1); Feb. 3, 2006.
Alan Conrad Bovik, Marianna Clark, Wilson S. Geisler, Multichannel Texture Analysis Using Localized Spatial Filters; Jan. 1990.
John Canny, A Computational Approach to Edge Detection, IEEE Transactions on Pattern Analysis and Machine Intelligence, vol. PAMI- 8, No. 6; Nov. 1986.
Edwin B. Olson, Robust and Efficient Robotic Mapping, Massachusetts Institute of Technology; 2008.
Giorgio Grisetti, et al., Nonlinear Constraint Network Optimization for Efficient Map Learning, 10 IEEE Transactions on Intelligent Transportation Systems 428; Sep. 2009.
Edwin Olson, et al., Fast Iterative Alignment of Pose Graphs with Poor Initial Estimates, Proceedings of the 2006 IEE Conference on Robotics and Automation; May 2006.
John Folkesson and Henrik I. Christensen, Closing the Loop with Graphical SLAM 23 IEEE Transactions on Robotics 731; Aug. 2007.
Carlos Estrada, et al., Hierarchical SLAM: Real-Time Accurate Mapping of Large Environments, 21 IEEE Transactions on Robotics 588; Aug. 2005.
Tim Bailey and Hugh Durrant-Whyte, Simultaneous Localization and Mapping (SLAM): Part II, IEEE Robotics & Optimization Magazine; Sep. 2006.
Seongsoo Lee and Sukhan Lee, Embedded visual SLAM: Applications for low-cost consumer robots, 20 IEEE Robotics & Automation Magazine 83; 2013.
J.A. Castellanos, J. Montiel, J. Neira, J.D Tardos, The SPmap: A probabilistic framework for simultaneous localization and map building, 15(5) IEEE Trans. Robotics and Automation 948-952; 1999.
J. Scholz, S. Chitta, B. Marthi, M. Likhachev, Cart Pushing with a Mobile Manipulation System: Towards Navigation with Moveable Objects, IEEE International Conference on Robotics and Automation 6115-6120; 2011.
Neato XV-11.
Internet Archives, WayBackMachine; http://www.neatorobotics.com/buy.html; Catured date: Jan. 23, 2010.
How Waterloo became a world-class robotics hub—The Globe and Mail; https://www.theglobeandmail.com/report-on-business/rob-magazine/how-waterloo-became-a-world-class-robotics-hub/article29784283/; Accessed Mar. 15, 2025.
News Release, iRobot Enters the Smart Home with Roomba® 980 Vacuum Cleaning Robot, Date: Sep. 16, 2015.
News Release, iRobot Expands Connected Product Line with Roomba® 960; Date: Aug. 4, 2016.
E. Eade, P. Fong and M. E. Munich, “Monocular graph SLAM with complexity reduction,” 2010 IEEE/RSJ International Conference on Intelligent Robots and Systems, Taipei, Taiwan, 2010, pp. 3017-3024.
Internet Archives, WayBackMachine; http://www.neatorobotics.com/faq.html; captured Jan. 24, 2010.
Neato XV-11 Robotic All-Floor Vacuum System; 2009.
Neato XV-11™ Vacuum User's Guide; Jan. 30, 2010.
Chang, Ya-Chun and Yoshio Yamamoto. “On-line path planning strategy integrated with collision and dead-lock avoidance schemes for wheeled mobile robot in indoor environments.” Ind. Robot 35 (2008): 421-434.
Internet Archives, WayBackMachine; http://www.robotreviews.com/reviews/review-of-the-neato-xv-11-the-roomba-killer; Catured date: Sep. 23, 2010.

* cited by examiner

SYSTEMS AND METHODS FOR DETERMINING POSITION ERRORS OF FRONT HAZARD SENSORS ON ROBOTS

PRIORITY

This application is a continuation of International Patent Application No. PCT/US21/53875 filed on Oct. 7, 2021 and claims the benefit of U.S. Provisional Patent Application Ser. No. 63/088,583 filed on Oct. 7, 2020 under 35 U.S.C. § 119, the entire disclosure of which is incorporated herein by reference.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNOLOGICAL FIELD

The present application generally relates to robotics, and more specifically to systems and methods for position error of front hazard sensors on robots.

SUMMARY

The foregoing needs are satisfied by the present disclosure, which provides for, inter alia, systems and methods for determining position error of front hazard sensors on robots. The present disclosure is directed towards a practical application for determining an error in a pose of a front hazard sensor for robots to enhance cliff detection capabilities of the robots to ensure safe navigation within environments comprising cliffs, ledges, curbsides, and the like.

Exemplary embodiments described herein have innovative features, no single one of which is indispensable or solely responsible for their desirable attributes. Without limiting the scope of the claims, some of the advantageous features will now be summarized.

According to at least one non-limiting exemplary embodiment, a method for detecting mounting errors in a front hazard sensor is disclosed. The method may comprise determining an expected distance reading of a front hazard sensor, determining discrepancies in the reading by comparing sensor data from the front hazard sensor to the expected distance reading, compiling the discrepancies and averaging them over time to determine an error parameter, and comparing the error parameter to a threshold. An error parameter meeting or exceeding the threshold may correspond to an error in the mounting of the front hazard sensor.

According to at least one non-limiting exemplary embodiment, a non-transitory computer-readable medium comprising a plurality of instructions stored thereon is disclosed. The non-transitory computer-readable storage medium may comprise instructions executable by a specialized processing apparatus. The instructions, when executed, may facilitate the specialized processing apparatus to determine an error in the mounting of a front hazard sensor using methods described in the present disclosure.

These and other objects, features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of “a”, “an”, and “the” include plural referents unless the context clearly dictates otherwise.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

Figure 1A:
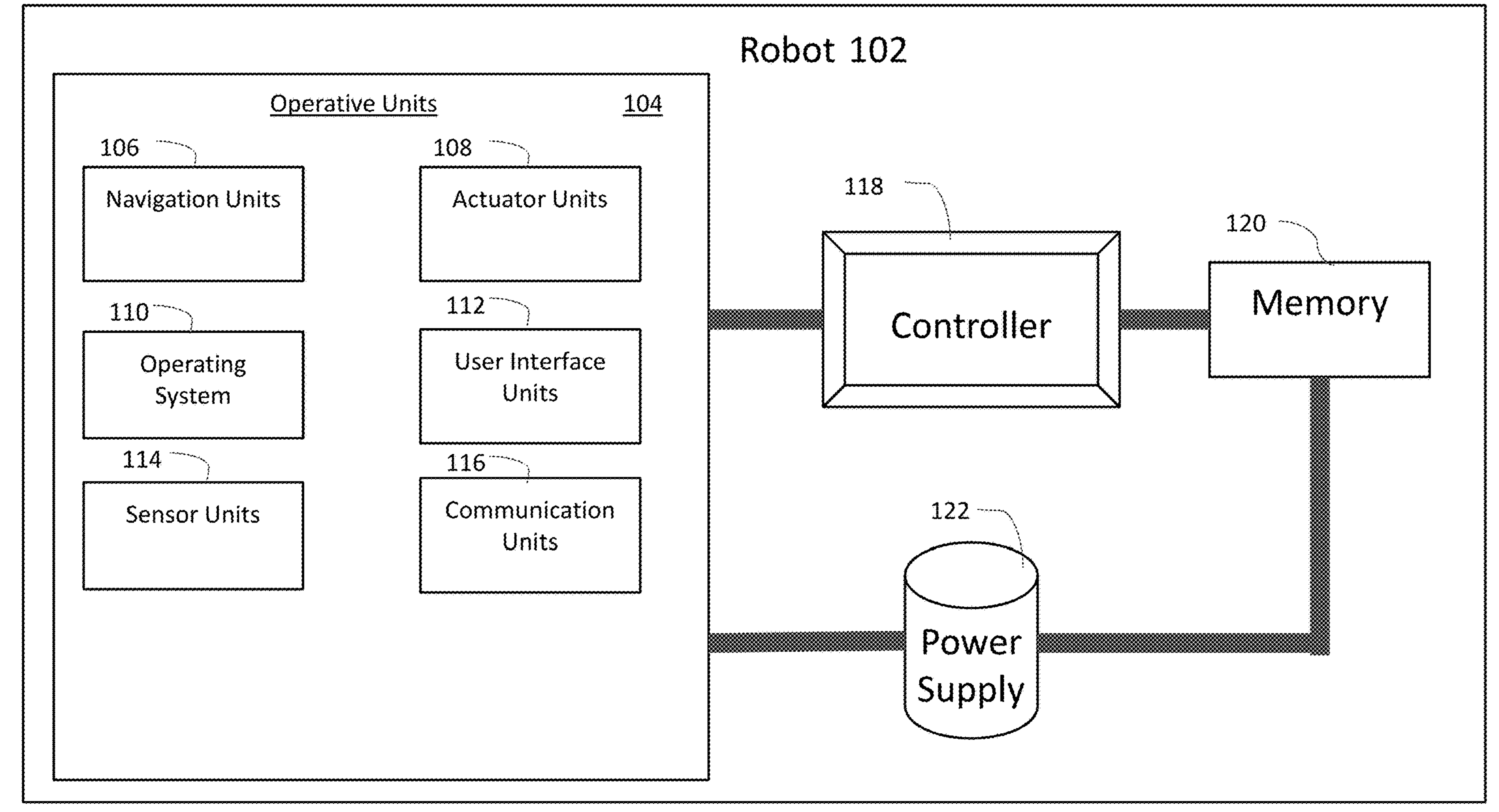
FIG. 1A is a functional block diagram of a main robot in accordance with some embodiments of this disclosure.

All Figures disclosed herein are © Copyright 2021 Brain Corporation. All rights reserved.

DETAILED DESCRIPTION

Currently, front hazard sensor are implemented in some robots to enable the robots to, at least in part, detect cliffs, edges, or drops in elevation of a floor in front of the robots. These front hazard sensor usually comprise distance measuring sensors positioned above the floor and aimed downwards towards the floor to detect sudden changes in the distance measured by the sensor. These sudden changes may comprise a cliff, edge, or drop in elevation of the floor.

In some instances, a robot may navigate between two points within an environment comprising at least one cliff, such as, for example, between a parking lot and a store wherein a curbside may be present. The robot may, with a correctly mounted front hazard sensor, determine how far from the robot the curbside is when approaching the curbside and navigate around the curbside accordingly. However, if the front hazard sensor is mounted incorrectly, either by the manufacturer of the robot or due to collisions with objects or typical wear and tear, the robot may detect the curbside at an incorrect distance from the robot causing the robot to navigate around the curbside incorrectly or, in some instances, not detect the curbside until the curbside is too close to the robot to be avoided.

As illustrated in this example, a robot with an incorrectly mounted front hazard sensor may be at risk of colliding with or falling off of the curbside, which may cause significant damage to the robot and pose a safety risk to nearby humans. Accordingly, there is a need in the art for systems and methods for determining an error in the mounting of a front hazard sensor.

Although cliff detection is an essential safety mechanism for robots which operate near ledges, cliffs, and other sharp drops, additional sensors on a robot for a detecting a single hazard may not be cost effective, both computationally and economically. Accordingly, there is a need in the art for further utilizing these sensors to detect objects ahead of a robot without inhibiting the ability of the robot to sense a cliff.

Various aspects of the novel systems, apparatuses, and methods disclosed herein are described more fully hereinafter with reference to the accompanying drawings. This disclosure can, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art would appreciate that the scope of the disclosure is intended to cover any aspect of the novel systems, apparatuses, and methods disclosed herein, whether implemented independently of, or combined with, any other aspect of the disclosure. For example, an apparatus may be implemented or a method may be practiced using any number of the aspects set forth herein. In addition, the scope of the disclosure is intended to cover such an apparatus or method that is practiced using other structure, functionality, or structure and functionality in addition to or other than the various aspects of the disclosure set forth herein. It should be understood that any aspect disclosed herein may be implemented by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, and/or objectives. The detailed description and drawings are merely illustrative of the disclosure rather than limiting, the scope of the disclosure being defined by the appended claims and equivalents thereof.

The present disclosure provides for improved systems and methods for determining an error in the mounting of a front hazard sensor. As used herein, a robot may include mechanical and/or virtual entities configured to carry out a complex series of tasks or actions autonomously. In some exemplary embodiments, robots may be machines that are guided and/or instructed by computer programs and/or electronic circuitry. In some exemplary embodiments, robots may include electro-mechanical components that are configured for navigation, where the robot may move from one location to another. Such robots may include autonomous and/or semi-autonomous cars, floor cleaners, rovers, drones, planes, boats, carts, trams, wheelchairs, industrial equipment, stocking machines, mobile platforms, personal transportation devices (e.g., hover boards, SEGWAYS®, etc.), stocking machines, trailer movers, vehicles, and the like. Robots may also include any autonomous and/or semi-autonomous machine for transporting items, people, animals, cargo, freight, objects, luggage, and/or anything desirable from one location to another.

As used herein, a front hazard sensor comprises of a sensor configured to, at least in part, detect cliffs in the surrounding navigable area of a robot. For example, a non-holonomic tricycle drive robot may utilize a front hazard sensor to detect objects or cliffs ahead of itself in order to stop without collision. As another example, a holonomic drive robot (e.g., using holonomic drivetrains, omni-wheels, etc. which allows it to turn in all directions instantaneously) may utilize front hazard sensors in all areas around its body, wherein 'front' may refer to any forward direction the robot is able to make.

As used herein, a mount or mounting of a sensor may correspond to the units configured to physically position and secure a sensor on a robot chassis. These units may comprise hardware such as screws, latches, sockets, magnets, or any other method of attaching and securing a sensor to a robot chassis. According to some non-limiting exemplary embodiments, these units may further be adjustable by an operator or a specialized processor sending control signals to actuators attached to the mounting causing adjustments to the mounting.

Figures 6A, 6B:
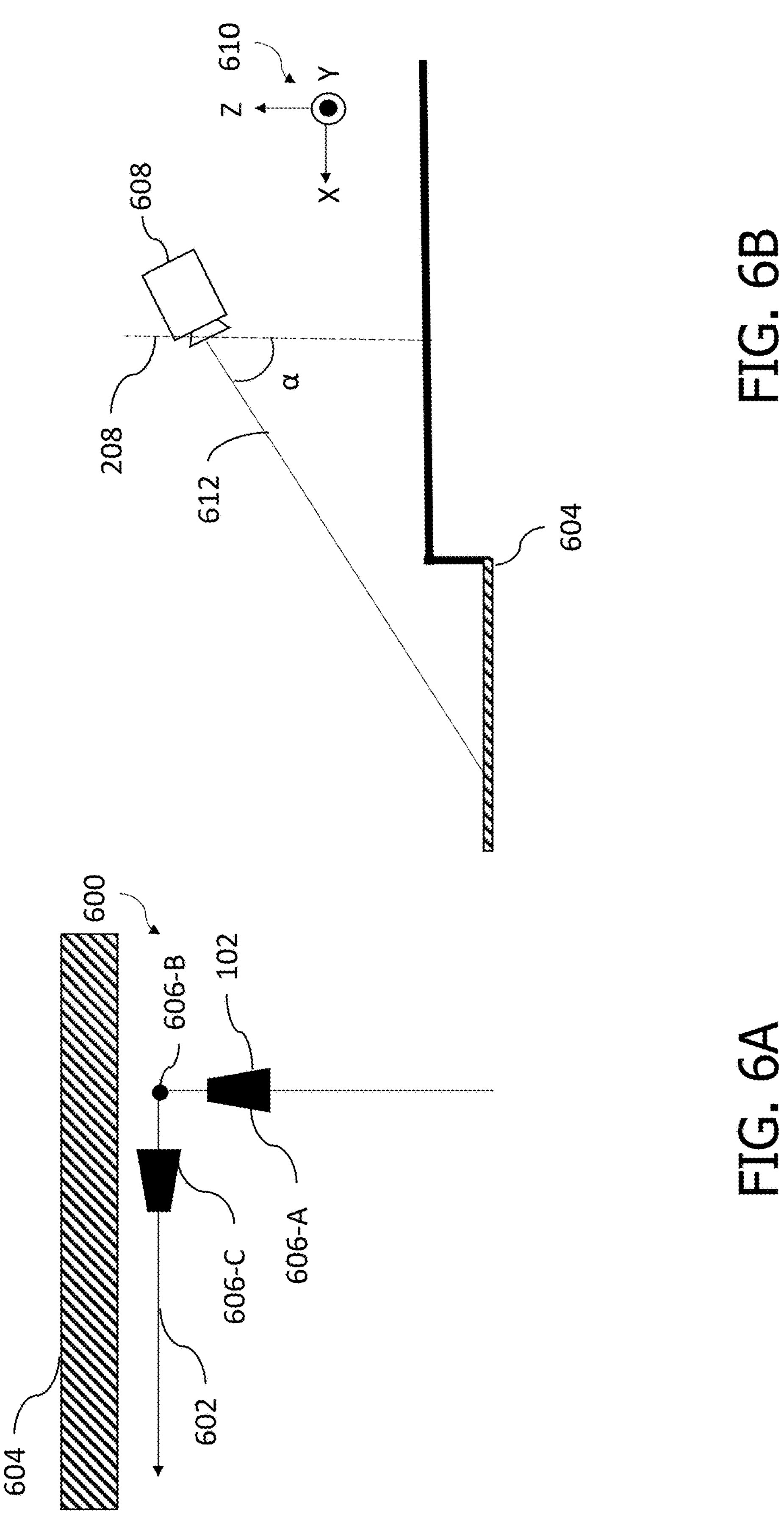
FIG. 6A illustrates a robot navigating along a route within an environment using a front hazard sensor according to an exemplary embodiment.
FIG. 6B illustrates a side view of the front hazard sensor used by the robot illustrated in FIG. 6A at a position along the route near a wall according to an exemplary embodiment.

As used herein, an outlier may correspond to data points collected during a brief duration in time that far exceeds the average value of the majority of data points. Additionally, outlier data may correspond to data not useful to or may cause errors in determining an error parameter. For example, a front hazard sensor may detect a wall for a brief duration before turning, as illustrated in FIG. 6A below, wherein data collected by the front hazard sensor during this duration may be considered an outlier as the distance measurement may vary greatly from the average of the distance measurements taken and may increase the value of the error parameter when no mounting error is present.

As used herein, network interfaces may include any signal, data, or software interface with a component, network, or process including, without limitation, those of the FireWire (e.g., FW400, FW800, FWS800T, FWS1600, FWS3200, etc.), universal serial bus ("USB") (e.g., USB 1.X, USB 2.0, USB 3.0, USB Type-C, etc.), Ethernet (e.g., 10/100, 10/100/1000 (Gigabit Ethernet), 10-Gig-E, etc.), multimedia over coax alliance technology ("MoCA"), Coaxsys (e.g., TVNET™), radio frequency tuner (e.g., in-band or OOB, cable modem, etc.), Wi-Fi (802.11), WiMAX (e.g., WiMAX (802.16)), PAN (e.g., PAN/802.15), cellular (e.g., 3G, 4G, or 5G including LTE/LTE-A/TD-LTE/TD-LTE, GSM, etc. variants thereof), IrDA families, etc. As used herein, Wi-Fi may include one or more of IEEE-Std. 802.11, variants of IEEE-Std. 802.11, standards related to IEEE-Std. 802.11 (e.g., 802.11 a/b/g/n/ac/ad/af/ah/ai/aj/aq/ax/ay), and/or other wireless standards.

As used herein, processor, microprocessor, and/or digital processor may include any type of digital processing device such as, without limitation, digital signal processors ("DSPs"), reduced instruction set computers ("RISC"), complex instruction set computers ("CISC") processors, microprocessors, gate arrays (e.g., field programmable gate arrays ("FPGAs")), programmable logic device ("PLDs"), reconfigurable computer fabrics ("RCFs"), array processors, secure microprocessors, and application-specific integrated circuits ("ASICs"). Such digital processors may be contained on a single unitary integrated circuit die or distributed across multiple components.

As used herein, computer program and/or software may include any sequence or human or machine cognizable steps which perform a function. Such computer program and/or software may be rendered in any programming language or environment including, for example, C/C++, C#, Fortran, COBOL, MATLAB™, PASCAL, GO, RUST, SCALA, Python, assembly language, markup languages (e.g., HTML, SGML, XML, VoXML), and the like, as well as object-oriented environments such as the Common Object Request Broker Architecture ("CORBA"), JAVA™ (including J2ME, Java Beans, etc.), Binary Runtime Environment (e.g., "BREW"), and the like.

As used herein, connection, link, and/or wireless link may include a causal link between any two or more entities (whether physical or logical/virtual), which enables information exchange between the entities.

As used herein, computer and/or computing device may include, but are not limited to, personal computers ("PCs") and minicomputers, whether desktop, laptop, or otherwise, mainframe computers, workstations, servers, personal digital assistants ("PDAs"), handheld computers, embedded computers, programmable logic devices, personal communicators, tablet computers, mobile devices, portable navigation aids, J2ME equipped devices, cellular telephones, smart phones, personal integrated communication or entertainment devices, and/or any other device capable of executing a set of instructions and processing an incoming data signal.

Detailed descriptions of the various embodiments of the system and methods of the disclosure are now provided. While many examples discussed herein may refer to specific exemplary embodiments, it will be appreciated that the described systems and methods contained herein are applicable to any kind of robot. Myriad other embodiments or uses for the technology described herein would be readily envisaged by those having ordinary skill in the art, given the contents of the present disclosure.

Advantageously, the systems and methods of this disclosure at least: (i) allow robots to detect errors in the mounting of a front hazard sensor; (ii) improve front hazard detection without inhibiting robotic function or using additional hardware; and (iii) improve the safety of operation of the robots in complex environments. Other advantages are readily discernible by one having ordinary skill in the art given the contents of the present disclosure.

According to at least one non-limiting exemplary embodiment, a method for detecting mounting errors in a front hazard sensor is disclosed. The method may comprise determining an expected distance reading of a front hazard sensor, determining discrepancies in the reading by comparing sensor data from the front hazard sensor to the expected distance reading, compiling the discrepancies and averaging them over time to determine an error parameter, and comparing the error parameter to a threshold. An error parameter meeting or exceeding the threshold may correspond to an error in the mounting of the front hazard sensor.

According to at least one non-limiting exemplary embodiment, a non-transitory computer-readable medium comprising a plurality of instructions stored thereon is disclosed. The non-transitory computer-readable storage medium may comprise instructions executable by a specialized processing apparatus. The instructions, when executed, may facilitate the specialized processing apparatus to determine an error in the mounting of a front hazard sensor using methods described in the present disclosure.

FIG. 1A is a functional block diagram of a robot 102 in accordance with some principles of this disclosure. As illustrated in FIG. 1A, robot 102 may include controller 118, memory 120, user interface unit 112, sensor units 114, navigation units 106, actuator unit 108, and communications unit 116, as well as other components and subcomponents (e.g., some of which may not be illustrated). Although a specific embodiment is illustrated in FIG. 1A, it is appreciated that the architecture may be varied in certain embodiments as would be readily apparent to one of ordinary skill given the contents of the present disclosure. As used herein, robot 102 may be representative at least in part of any robot described in this disclosure.

Controller 118 may control the various operations performed by robot 102. Controller 118 may include and/or comprise one or more processing devices (e.g., microprocessing devices) and other peripherals. As previously mentioned and used herein, processing device, microprocessing device, and/or digital processing device may include any type of digital processing device such as, without limitation, digital signal processing devices ("DSPs"), reduced instruction set computers ("RISC"), complex instruction set computers ("CISC"), microprocessing devices, gate arrays (e.g., field programmable gate arrays ("FPGAs")), programmable logic device ("PLDs"), reconfigurable computer fabrics ("RCFs"), array processing devices, secure microprocessing devices and application-specific integrated circuits ("ASICs"). Peripherals may include hardware accelerators configured to perform a specific function using hardware elements such as, without limitation, encryption/description hardware, algebraic processing devices (e.g., tensor processing units, quadradic problem solvers, multipliers, etc.), data compressors, encoders, arithmetic logic units ("ALU"), and the like. Such digital processing devices may be contained on a single unitary integrated circuit die, or distributed across multiple components.

Controller 118 may be operatively and/or communicatively coupled to memory 120. Memory 120 may include any type of integrated circuit or other storage device configured to store digital data including, without limitation, read-only memory ("ROM"), random access memory ("RAM"), non-volatile random access memory ("NVRAM"), programmable read-only memory ("PROM"), electrically erasable programmable read-only memory ("EEPROM"), dynamic random-access memory ("DRAM"), Mobile DRAM, synchronous DRAM ("SDRAM"), double data rate SDRAM ("DDR/2

SDRAM"), extended data output ("EDO") RAM, fast page mode RAM ("FPM"), reduced latency DRAM ("RL-DRAM"), static RAM ("SRAM"), flash memory (e.g., NAND/NOR), memristor memory, pseudostatic RAM ("PSRAM"), etc. Memory 120 may provide computer-readable instructions and data to controller 118. For example, memory 120 may be a non-transitory, computer-readable storage apparatus and/or medium having a plurality of instructions stored thereon, the instructions being executable by a processing apparatus (e.g., controller 118) to operate robot 102. In some cases, the computer-readable instructions may be configured to, when executed by the processing apparatus, cause the processing apparatus to perform the various methods, features, and/or functionality described in this disclosure. Accordingly, controller 118 may perform logical and/or arithmetic operations based on program instructions stored within memory 120. In some cases, the instructions and/or data of memory 120 may be stored in a combination of hardware, some located locally within robot 102, and some located remote from robot 102 (e.g., in a cloud, server, network, etc.).

It should be readily apparent to one of ordinary skill in the art that a processing device may be internal to or on board robot 102 and/or may be external to robot 102 and be communicatively coupled to controller 118 of robot 102 utilizing communication units 116 wherein the external processing device may receive data from robot 102, process the data, and transmit computer-readable instructions back to controller 118. In at least one non-limiting exemplary embodiment, the processing device may be on a remote server (not shown).

In some exemplary embodiments, memory 120, shown in FIG. 1A, may store a library of sensor data. In some cases, the sensor data may be associated at least in part with objects and/or people. In exemplary embodiments, this library may include sensor data related to objects and/or people in different conditions, such as sensor data related to objects and/or people with different compositions (e.g., materials, reflective properties, molecular makeup, etc.), different lighting conditions, angles, sizes, distances, clarity (e.g., blurred, obstructed/occluded, partially off frame, etc.), colors, surroundings, and/or other conditions. The sensor data in the library may be taken by a sensor (e.g., a sensor of sensor units 114 or any other sensor) and/or generated automatically, such as with a computer program that is configured to generate/simulate (e.g., in a virtual world) library sensor data (e.g., which may generate/simulate these library data entirely digitally and/or beginning from actual sensor data) from different lighting conditions, angles, sizes, distances, clarity (e.g., blurred, obstructed/occluded, partially off frame, etc.), colors, surroundings, and/or other conditions. The number of images in the library may depend at least in part on one or more of the amount of available data, the variability of the surrounding environment in which robot 102 operates, the complexity of objects and/or people, the variability in appearance of objects, physical properties of robots, the characteristics of the sensors, and/or the amount of available storage space (e.g., in the library, memory 120, and/or local or remote storage). In exemplary embodiments, at least a portion of the library may be stored on a network (e.g., cloud, server, distributed network, etc.) and/or may not be stored completely within memory 120. As yet another exemplary embodiment, various robots (e.g., that are commonly associated, such as robots by a common manufacturer, user, network, etc.) may be networked so that data captured by individual robots are collectively shared with other robots. In such a fashion, these robots may be configured to learn and/or share sensor data in order to facilitate the ability to readily detect and/or identify errors and/or assist events.

Still referring to FIG. 1A, operative units 104 may be coupled to controller 118, or any other controller, to perform the various operations described in this disclosure. One, more, or none of the modules in operative units 104 may be included in some embodiments. Throughout this disclosure, reference may be to various controllers and/or processing devices. In some embodiments, a single controller (e.g., controller 118) may serve as the various controllers and/or processing devices described. In other embodiments different controllers and/or processing devices may be used, such as controllers and/or processing devices used particularly for one or more operative units 104. Controller 118 may send and/or receive signals, such as power signals, status signals, data signals, electrical signals, and/or any other desirable signals, including discrete and analog signals to operative units 104. Controller 118 may coordinate and/or manage operative units 104, and/or set timings (e.g., synchronously or asynchronously), turn off/on control power budgets, receive/send network instructions and/or updates, update firmware, send interrogatory signals, receive and/or send statuses, and/or perform any operations for running features of robot 102.

Returning to FIG. 1A, operative units 104 may include various units that perform functions for robot 102. For example, operative units 104 includes at least navigation units 106, actuator units 108, user interface units 112, sensor units 114, and communication units 116. Operative units 104 may also comprise other units such as specifically configured task units (not shown) that provide the various functionality of robot 102. In exemplary embodiments, operative units 104 may be instantiated in software, hardware, or both software and hardware. For example, in some cases, units of operative units 104 may comprise computer implemented instructions executed by a controller. In exemplary embodiments, units of operative unit 104 may comprise hardcoded logic (e.g., ASICS). In exemplary embodiments, units of operative units 104 may comprise both computer-implemented instructions executed by a controller and hardcoded logic. Where operative units 104 are implemented in part in software, operative units 104 may include units/modules of code configured to provide one or more functionalities.

In exemplary embodiments, navigation units 106 may include systems and methods that may computationally construct and update a map of an environment, localize robot 102 (e.g., find the position) in a map, and navigate robot 102 to/from destinations. The mapping may be performed by imposing data obtained in part by sensor units 114 into a computer-readable map representative at least in part of the environment. In exemplary embodiments, a map of an environment may be uploaded to robot 102 through user interface units 112, uploaded wirelessly or through wired connection, or taught to robot 102 by a user.

In exemplary embodiments, navigation units 106 may include components and/or software configured to provide directional instructions for robot 102 to navigate. Navigation units 106 may process maps, routes, and localization information generated by mapping and localization units, data from sensor units 114, and/or other operative units 104.

Still referring to FIG. 1A, actuator units 108 may include actuators such as electric motors, gas motors, driven magnet systems, solenoid/ratchet systems, piezoelectric systems (e.g., inchworm motors), magneto strictive elements, gesticulation, and/or any way of driving an actuator known in the art. By way of illustration, such actuators may actuate the wheels for robot 102 to navigate a route; navigate around obstacles; rotate cameras and sensors. According to exemplary embodiments, actuator unit 108 may include systems that allow movement of robot 102, such as motorize propulsion. For example, motorized propulsion may move robot 102 in a forward or backward direction, and/or be used at least in part in turning robot 102 (e.g., left, right, and/or any other direction). By way of illustration, actuator unit 108 may control if robot 102 is moving or is stopped and/or allow robot 102 to navigate from one location to another location.

Actuator unit 108 may also include any system used for actuating and, in some cases actuating task units to perform tasks. For example, actuator unit 108 may include driven magnet systems, motors/engines (e.g., electric motors, combustion engines, steam engines, and/or any type of motor/engine known in the art), solenoid/ratchet system, piezoelectric system (e.g., an inchworm motor), magnetostrictive elements, gesticulation, and/or any actuator known in the art.

According to exemplary embodiments, sensor units 114 may comprise systems and/or methods that may detect characteristics within and/or around robot 102. Sensor units 114 may comprise a plurality and/or a combination of sensors. Sensor units 114 may include sensors that are internal to robot 102 or external, and/or have components that are partially internal and/or partially external. In some cases, sensor units 114 may include one or more exteroceptive sensors, such as sonars, light detection and ranging ("LiDAR") sensors, radars, lasers, cameras (including video cameras (e.g., red-blue-green ("RBG") cameras, infrared cameras, three-dimensional ("3D") cameras, thermal cameras, etc.), time of flight ("ToF") cameras, structured light cameras, etc.), antennas, motion detectors, microphones, and/or any other sensor known in the art. According to some exemplary embodiments, sensor units 114 may collect raw measurements (e.g., currents, voltages, resistances, gate logic, etc.) and/or transformed measurements (e.g., distances, angles, detected points in obstacles, etc.). In some cases, measurements may be aggregated and/or summarized. Sensor units 114 may generate data based at least in part on distance or height measurements. Such data may be stored in data structures, such as matrices, arrays, queues, lists, arrays, stacks, bags, etc.

According to exemplary embodiments, sensor units 114 may include sensors that may measure internal characteristics of robot 102. For example, sensor units 114 may measure temperature, power levels, statuses, and/or any characteristic of robot 102. In some cases, sensor units 114 may be configured to determine the odometry of robot 102. For example, sensor units 114 may include proprioceptive sensors, which may comprise sensors such as accelerometers, inertial measurement units ("IMU"), odometers, gyroscopes, speedometers, cameras (e.g. using visual odometry), clock/timer, and the like. Odometry may facilitate autonomous navigation and/or autonomous actions of robot 102. This odometry may include robot 102's position (e.g., where position may include robot's location, displacement and/or orientation, and may sometimes be interchangeable with the term pose as used herein) relative to the initial location. Such data may be stored in data structures, such as matrices, arrays, queues, lists, arrays, stacks, bags, etc. According to exemplary embodiments, the data structure of the sensor data may be called an image.

According to exemplary embodiments, sensor units 114 may be in part external to the robot 102 and coupled to communications units 116. For example, a security camera within an environment of a robot 102 may provide a controller 118 of the robot 102 with a video feed via wired or wireless communication channel(s). In some instances, sensor units 114 may include sensors configured to detect a presence of an object at a location such as, for example without limitation, a pressure or motion sensor may be disposed at a shopping cart storage location of a grocery store, wherein the controller 118 of the robot 102 may utilize data from the pressure or motion sensor to determine if the robot 102 should retrieve more shopping carts for customers.

According to exemplary embodiments, user interface units 112 may be configured to enable a user to interact with robot 102. For example, user interface units 112 may include touch panels, buttons, keypads/keyboards, ports (e.g., universal serial bus ("USB"), digital visual interface ("DVI"), Display Port, E-Sata, Firewire, PS/2, Serial, VGA, SCSI, audioport, high-definition multimedia interface ("HDMI"), personal computer memory card international association ("PCMCIA") ports, memory card ports (e.g., secure digital ("SD") and miniSD), and/or ports for computer-readable medium), mice, rollerballs, consoles, vibrators, audio transducers, and/or any interface for a user to input and/or receive data and/or commands, whether coupled wirelessly or through wires. Users may interact through voice commands or gestures. User interface units 112 may include a display, such as, without limitation, liquid crystal display ("LCDs"), light-emitting diode ("LED") displays, LED LCD displays, in-plane-switching ("IPS") displays, cathode ray tubes, plasma displays, high definition ("HD") panels, 4K displays, retina displays, organic LED displays, touchscreens, surfaces, canvases, and/or any displays, televisions, monitors, panels, and/or devices known in the art for visual presentation. According to exemplary embodiments user interface units 112 may be positioned on the body of robot 102. According to exemplary embodiments, user interface units 112 may be positioned away from the body of robot 102 but may be communicatively coupled to robot 102 (e.g., via communication units including transmitters, receivers, and/or transceivers) directly or indirectly (e.g., through a network, server, and/or a cloud). According to exemplary embodiments, user interface units 112 may include one or more projections of images on a surface (e.g., the floor) proximally located to the robot, e.g., to provide information to the occupant or to people around the robot. The information could be the direction of future movement of the robot, such as an indication of moving forward, left, right, back, at an angle, and/or any other direction. In some cases, such information may utilize arrows, colors, symbols, etc.

According to exemplary embodiments, communications unit 116 may include one or more receivers, transmitters, and/or transceivers. Communications unit 116 may be configured to send/receive a transmission protocol, such as BLUETOOTH®, ZIGBEE®, Wi-Fi, induction wireless data transmission, radio frequencies, radio transmission, radio-frequency identification ("RFID"), near-field communication ("NFC"), infrared, network interfaces, cellular technologies such as 3G (3.5G, 3.75G, 3GPP/3GPP2/HSPA+), 4G (4GPP/4GPP2/LTE/LTE-TDD/LTE-FDD), 5G (5GPP/5GPP2), or 5G LTE (long-term evolution, and variants thereof including LTE-A, LTE-U, LTE-A Pro, etc.), high-speed downlink packet access ("HSDPA"), high-speed uplink packet access ("HSUPA"), time division multiple access ("TDMA"), code division multiple access ("CDMA") (e.g., IS-95A, wideband code division multiple access ("WCDMA"), etc.), frequency hopping spread spectrum ("FHSS"), direct sequence spread spectrum ("DSSS"), global system for mobile communication ("GSM"), Personal Area Network ("PAN") (e.g., PAN/802.15), worldwide interoperability for microwave access ("WiMAX"), 802.20, long term evolution ("LTE") (e.g., LTE/LTE-A), time division LTE ("TD-LTE"), global system for mobile communication ("GSM"), narrowband/frequency-division multiple access ("FDMA"), orthogonal frequency-division multiplexing ("OFDM"), analog cellular, cellular digital packet data ("CDPD"), satellite systems, millimeter wave or microwave systems, acoustic, infrared (e.g., infrared data association ("IrDA")), and/or any other form of wireless data transmission.

Communications unit 116 may also be configured to send/receive signals utilizing a transmission protocol over wired connections, such as any cable that has a signal line and ground. For example, such cables may include Ethernet cables, coaxial cables, Universal Serial Bus ("USB"), FireWire, and/or any connection known in the art. Such protocols may be used by communications unit 116 to communicate to external systems, such as computers, smart phones, tablets, data capture systems, mobile telecommunications networks, clouds, servers, or the like. Communications unit 116 may be configured to send and receive signals comprising of numbers, letters, alphanumeric characters, and/or symbols. In some cases, signals may be encrypted, using algorithms such as 128-bit or 256-bit keys and/or other encryption algorithms complying with standards such as the Advanced Encryption Standard ("AES"), RSA, Data Encryption Standard ("DES"), Triple DES, and the like. Communications unit 116 may be configured to send and receive statuses, commands, and other data/information. For example, communications unit 116 may communicate with a user operator to allow the user to control robot 102. Communications unit 116 may communicate with a server/network (e.g., a network) in order to allow robot 102 to send data, statuses, commands, and other communications to the server. The server may also be communicatively coupled to computer(s) and/or device(s) that may be used to monitor and/or control robot 102 remotely. Communications unit 116 may also receive updates (e.g., firmware or data updates), data, statuses, commands, and other communications from a server for robot 102.

In exemplary embodiments, operating system 110 may be configured to manage memory 120, controller 118, power supply 122, modules in operative units 104, and/or any software, hardware, and/or features of robot 102. For example, and without limitation, operating system 110 may include device drivers to manage hardware recourses for robot 102.

In exemplary embodiments, power supply 122 may include one or more batteries, including, without limitation, lithium, lithium ion, nickel-cadmium, nickel-metal hydride, nickel-hydrogen, carbon-zinc, silver-oxide, zinc-carbon, zinc-air, mercury oxide, alkaline, or any other type of battery known in the art. Certain batteries may be rechargeable, such as wirelessly (e.g., by resonant circuit and/or a resonant tank circuit) and/or plugging into an external power source. Power supply 122 may also be any supplier of energy, including wall sockets and electronic devices that convert solar, wind, water, nuclear, hydrogen, gasoline, natural gas, fossil fuels, mechanical energy, steam, and/or any power source into electricity.

One or more of the units described with respect to FIG. 1A (including memory 120, controller 118, sensor units 114, user interface unit 112, actuator unit 108, communications unit 116, mapping and localization unit 126, and/or other units) may be integrated onto robot 102, such as in an integrated system. However, according to some exemplary embodiments, one or more of these units may be part of an attachable module. This module may be attached to an existing apparatus to automate so that it behaves as a robot. Accordingly, the features described in this disclosure with reference to robot 102 may be instantiated in a module that may be attached to an existing apparatus and/or integrated onto robot 102 in an integrated system. Moreover, in some cases, a person having ordinary skill in the art would appreciate from the contents of this disclosure that at least a portion of the features described in this disclosure may also be run remotely, such as in a cloud, network, and/or server.

As used herein, a robot 102, a controller 118, or any other controller, processing device, or robot performing a task, operation or transformation illustrated in the figures below comprises a controller executing computer readable instructions stored on a non-transitory computer readable storage apparatus, such as memory 120, as would be appreciated by one skilled in the art.

Figure 1B:
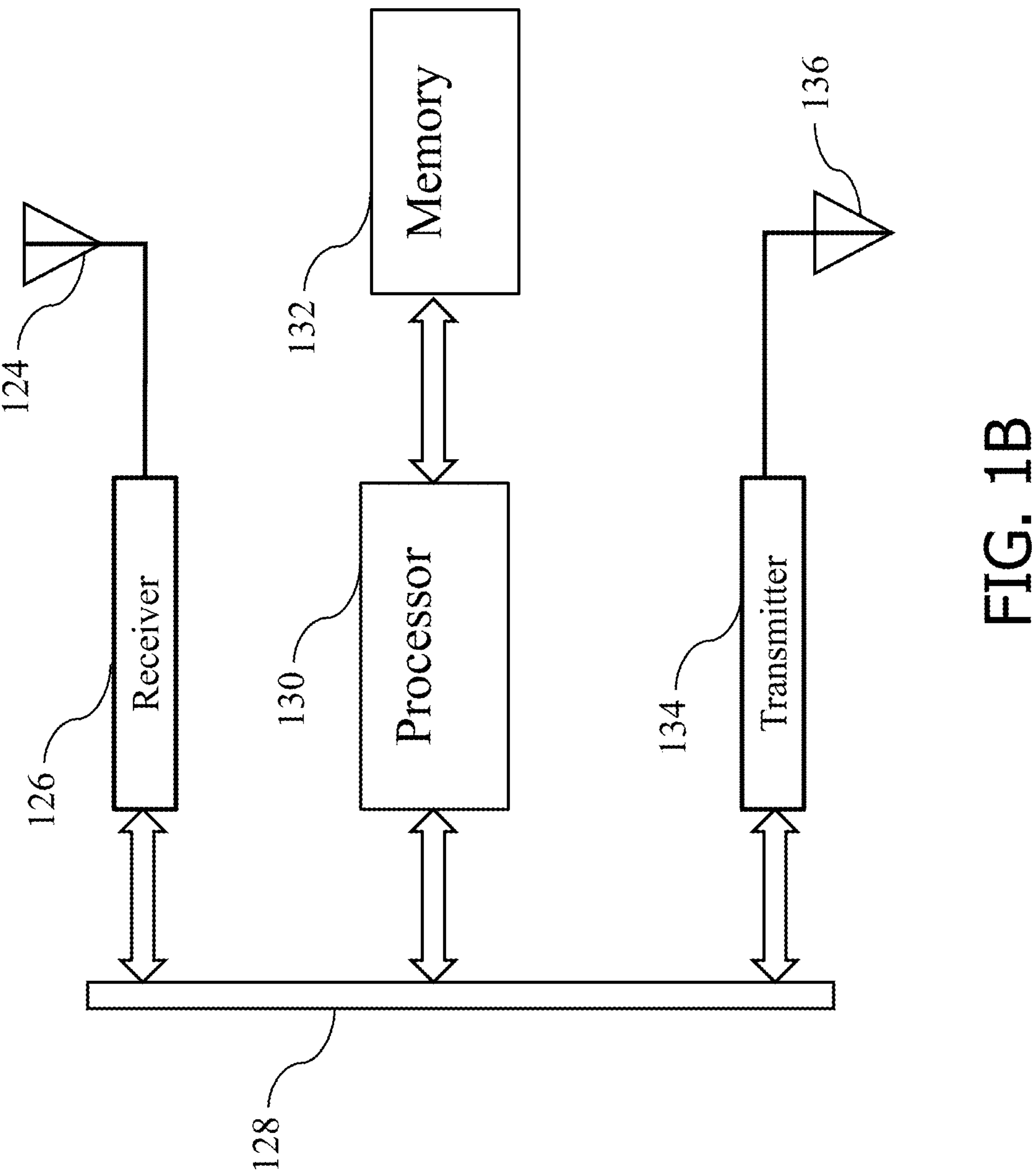
FIG. 1B is a functional block diagram of a controller or processor in accordance with some embodiments of this disclosure.

Next referring to FIG. 1B, the architecture of a processor or processing device 138 is illustrated according to an exemplary embodiment. As illustrated in FIG. 1B, the processing device 138 includes a data bus 128, a receiver 126, a transmitter 134, at least one processor 130, and a memory 132. The receiver 126, the processor 130 and the transmitter 134 all communicate with each other via the data bus 128. The processor 130 is configurable to access the memory 132 which stores computer code or computer readable instructions in order for the processor 130 to execute the specialized algorithms. As illustrated in FIG. 1B, memory 132 may comprise some, none, different, or all of the features of memory 120 previously illustrated in FIG. 1A. The algorithms executed by the processor 130 are discussed in further detail below. The receiver 126 as shown in FIG. 1B is configurable to receive input signals 124. The input signals 124 may comprise signals from a plurality of operative units 104 illustrated in FIG. 1A including, but not limited to, sensor data from sensor units 114, user inputs, motor feedback, external communication signals (e.g., from a remote server), and/or any other signal from an operative unit 104 requiring further processing. The receiver 126 communicates these received signals to the processor 130 via the data bus 128. As one skilled in the art would appreciate, the data bus 128 is the means of communication between the different components—receiver, processor, and transmitter—in the processing device. The processor 130 executes the algorithms, as discussed below, by accessing specialized computer-readable instructions from the memory 132. Further detailed description as to the processor 130 executing the specialized algorithms in receiving, processing and transmitting of these signals is discussed above with respect to FIG. 1A. The memory 132 is a storage medium for storing computer code or instructions. The storage medium may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage medium may include volatile, nonvolatile, dynamic, static, read/write, read-only, random-access, sequential-access, location-addressable, file-addressable, and/or content-addressable devices. The processor 130 may communicate output signals to transmitter 134 via data bus 128 as illustrated. The transmitter 134 may be configurable to further communicate the output signals to a plurality of operative units 104 illustrated by signal output 136.

One of ordinary skill in the art would appreciate that the architecture illustrated in FIG. 1B may illustrate an external server architecture configurable to effectuate the control of a robotic apparatus from a remote location, such as server 202 illustrated next in FIG. 2. That is, the server may also include a data bus, a receiver, a transmitter, a processor, and a memory that stores specialized computer readable instructions thereon.

One of ordinary skill in the art would appreciate that a controller 118 of a robot 102 may include one or more processing devices 138 and may further include other peripheral devices used for processing information, such as ASICS, DPS, proportional-integral-derivative ("PID") controllers, hardware accelerators (e.g., encryption/decryption hardware), and/or other peripherals (e.g., analog to digital converters) described above in FIG. 1A. The other peripheral devices when instantiated in hardware are commonly used within the art to accelerate specific tasks (e.g., multiplication, encryption, etc.) which may alternatively be performed using the system architecture of FIG. 1B. In some instances, peripheral devices are used as a means for intercommunication between the controller 118 and operative units 104 (e.g., digital to analog converters and/or amplifiers for producing actuator signals). Accordingly, as used herein, the controller 118 executing computer readable instructions to perform a function may include one or more processing devices 138 thereof executing computer readable instructions and, in some instances, the use of any hardware peripherals known within the art. Controller 118 may be illustrative of various processing devices 138 and peripherals integrated into a single circuit die or distributed to various locations of the robot 102 which receive, process, and output information to/from operative units 104 of the robot 102 to effectuate control of the robot 102 in accordance with instructions stored in a memory 120, 132. For example, controller 118 may include a plurality of processing devices 138 for performing high level tasks (e.g., planning a route to avoid obstacles) and processing devices 138 for performing low-level tasks (e.g., producing actuator signals in accordance with the route).

As used herein with respect to FIG. 2-6, the reference coordinates as illustrated correspond to the same coordinate system used throughout FIG. 2-6, wherein the x, y, and z directions are the same direction throughout FIG. 2-6 (e.g., z direction always extends vertically from the floor). An axis within the reference coordinates represented by a dotted circle, as used herein, corresponds to an axis extending outward from the page. All reference coordinates as illustrated comprise a right-handed Cartesian coordinate system. The reference coordinates as used in the figures below are for illustrative clarity for each respective view the sensor(s) and are not intended to be limiting. It is also presumed throughout FIG. 2-6 that a front hazard sensor (e.g., sensor 202, 302, 404, etc.) as illustrated may be mounted on a robot (e.g., 102) which is not shown for illustrative purposes.

Figure 2B:
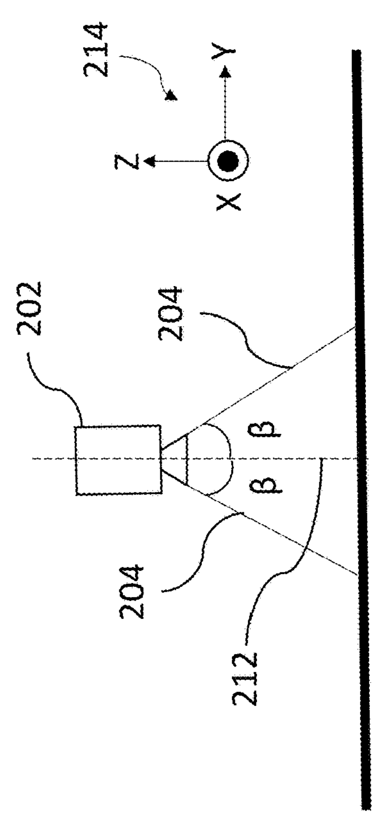
FIG. 2A-B illustrate a correctly mounted front hazard sensor, according to an exemplary embodiment.
Figure 2A:
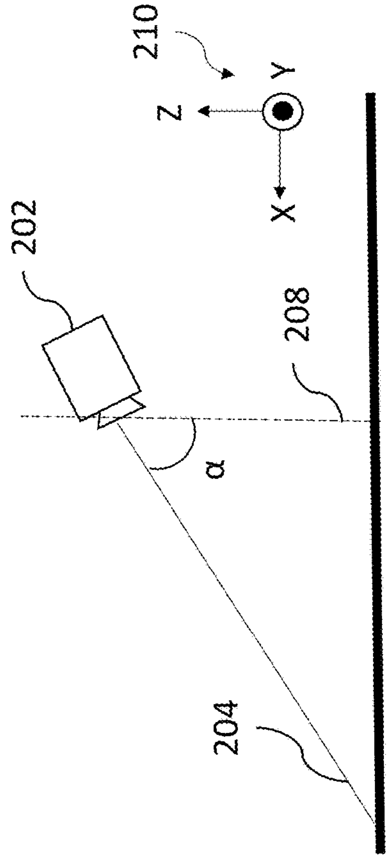

FIG. 2A illustrates a side view, with respect to the X-Z plane as illustrated by reference coordinates 210, of a front hazard sensor 202 collecting data or distance measurements, illustrated by sensor vision line 204, between the front hazard sensor 202 and a floor according to an exemplary embodiment. Cliff detection sensor may be tilted by an angle alpha (α), with respect to a vertical axis 208, wherein angle alpha (α) may be a default pitch angle for cliff detection sensor 202 to operate correctly with respect to vertical axis 208. As used herein, a default pose or position of a sensor on a robot 102 comprises its manufacturer-specified or well-calibrated pose.

FIG. 2B illustrates a front view, with respect to the Y-Z plane as illustrated by reference coordinates 214, of cliff detection sensor 202 mounted on a robot 102 (not shown) according to an exemplary embodiment. The front hazard sensor 202 may comprise a planar LiDAR sensor configured to measure distances and represent the measured distances in a point cloud. The front hazard sensor 202 may be orientated along axis 212, as illustrated, wherein the front hazard sensor 202 may comprise a field of view illustrated by angle beta (β) on both sides of axis 212, illustrated by sensor vision lines 204, wherein beta (β) may comprise any numeric value up to 180°. Angles beta (β) may correspond to the correct lateral measurement angle range on both sides of axis 212, or the Z axis, for a correctly orientated sensor 202. That is, the default pose of the front hazard sensor 202 may correspond to the front hazard sensor 202 being aligned with respect to the z-axis and with a pitch angle, with respect to the x-axis, of alpha (α).

Angles alpha (α) and beta (β) may be selected such that, when viewing a flat floor, the angle subtended on the floor by the sensor 202 is (i) wide enough to encompass the width of the robot 102 (i.e., 2β being greater than the robot 102 width), and (ii) is sufficiently far ahead of the robot 102 such that the robot 102 is able to stop if an object/cliff is sensed by the sensor 202. One skilled in the art may appreciate angles alpha (α) and beta (β) may comprise of portions of a larger measurement, such as an angular range of a 360° LiDAR, a depth camera, or a three dimensional LiDAR, wherein the illustrated ranges are not intended to be limiting.

According to at least one non-limiting exemplary embodiment, angles alpha (α) and beta (β) may be communicated to controller 118 by a user during manufacture of a robot 102, wherein controller 118, executing specialized algorithms, may calculate a distance measurement based on the angles and a time delay of an electromagnetic pulse (e.g., photons) traveling from a front hazard sensor 202, to the floor, and back to the front hazard sensor 202. Using this data, front hazard sensor 202 may determine a cliff upon not measuring a return photon or measuring an increase in the time delay of the photon corresponding to a larger distance measurement, which may be indicative of a cliff in an otherwise flat floor. Over time, the pose of the front hazard sensor 202 on a robot 102 may change due to external factors such as collisions with objects, typical wear and tear, the robot navigating over bumps in the floor, and so forth.

Figure 2C:
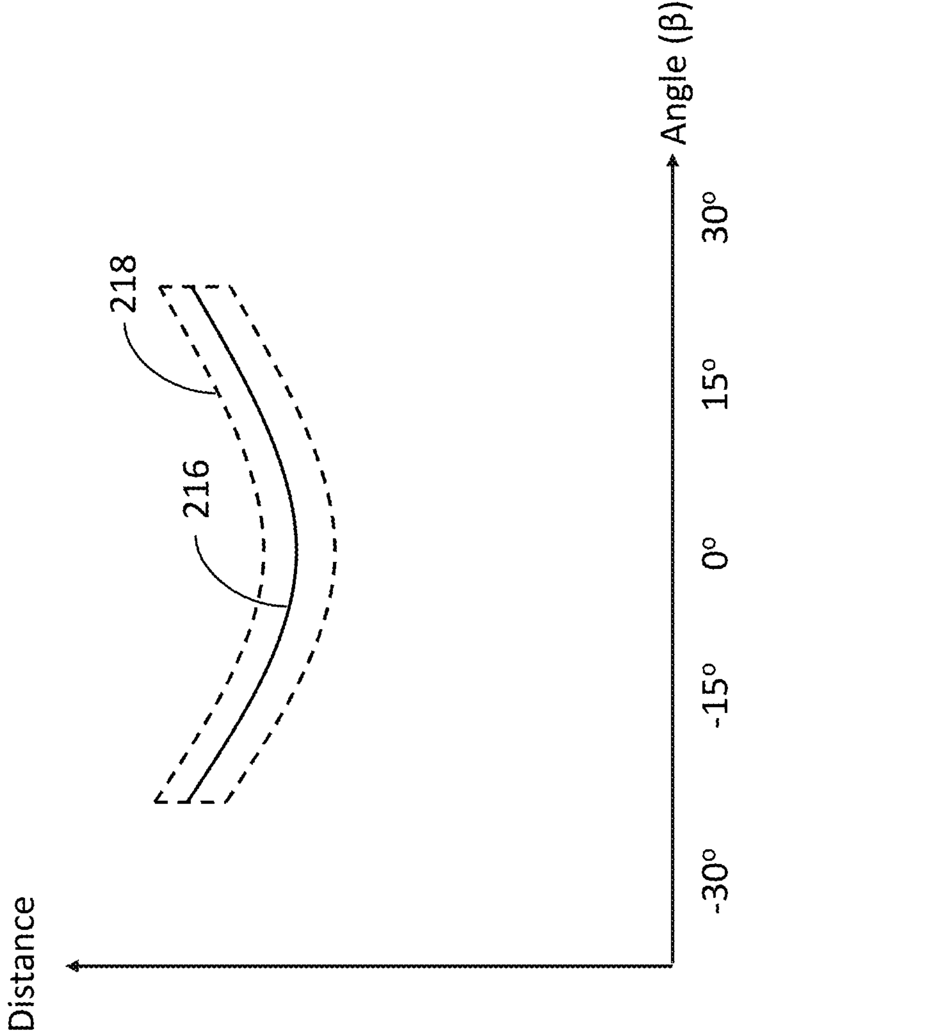
FIG. 2C illustrates an expected sensor reading by a properly mounted front hazard sensor according to an exemplary embodiment.

FIG. 2C illustrates an exemplary distance measurement 216 by a front hazard sensor 202, previously illustrated in FIG. 2A-B, according to an exemplary embodiment. As a robot 102 navigates an environment, the front hazard sensor 202 would see little to no change in distance between the sensor 202 and the floor, wherein a sudden increase in the distance measurement may be indicative of a cliff or sharp edge causing the robot 102 to navigate away from the cliff or sharp edge. Similarly, a sudden decrease in the distance measurement may be indicative of a wall in front of the robot 102, which may cause the robot 102 to turn away from the wall, as illustrated below in FIGS. 6A-B. Distance measurement 216 may correspond to an expected distance measurement, wherein an expected distance measurement comprises a distance measurement between the front hazard sensor 202 and a floor with no cliffs, edges, or error with a mounting of the sensor. The magnitude of the expected distance measurement 216 at angle beta equal to zero (β) may comprise, with reference to FIG. 2A, a height along axis 208 at which the sensor 202 is positioned from the floor divided by a cosine of angle alpha (α). Threshold margin of error 218, illustrated with dashed lines, may correspond to a prescribed threshold for an expected measurement range and may be implemented to account for small variations in the floor such as bumps, dips, vibrations, or other noise of the sensor 202 and/or caused by the movement of a robot 102. As illustrated in FIG. 2C, measurement 216 and the threshold margin of error 218 may only comprise measurements between positive and negative angle beta (β), approximately ±20° in the exemplary embodiment illustrated, as measurements taken outside of this range may be influenced by surrounding objects (e.g., narrow passageways, nearby objects, etc.) and may not be useful by a front hazard sensor 202 to detect a cliff in front of a robot 102. According to another non-limiting exemplary embodiment, the measurement range used to detect cliffs in front of or around a robot, illustrated by angle beta (β), may range from zero to one-hundred eighty degrees (0°-180°).

Figure 3B:
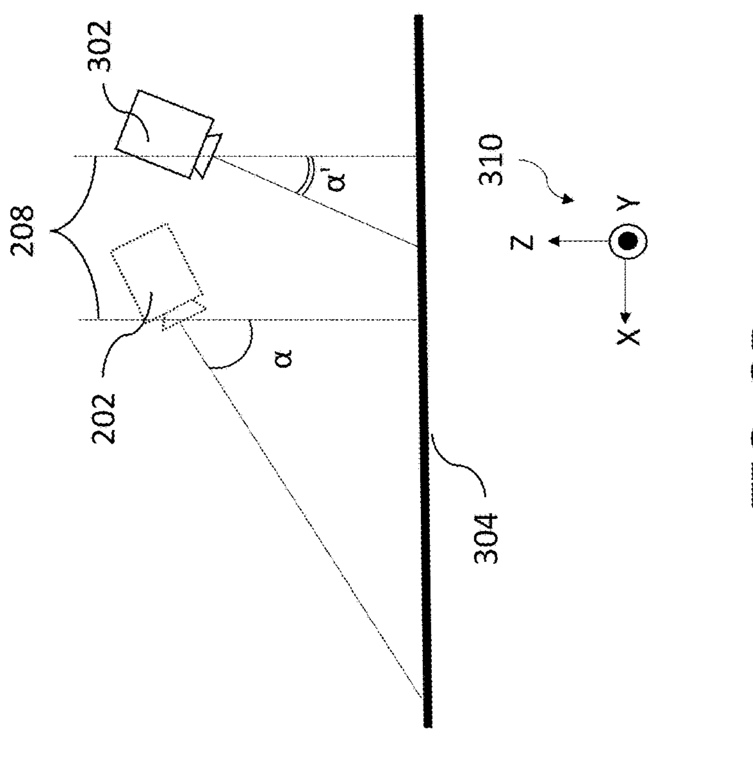
FIG. 3B illustrates a sensor reading of the front hazard sensor illustrated in FIG. 3A being compared to an expected reading, within a margin of error, of a properly mounted front hazard sensor according to an exemplary embodiment.
Figure 3A:
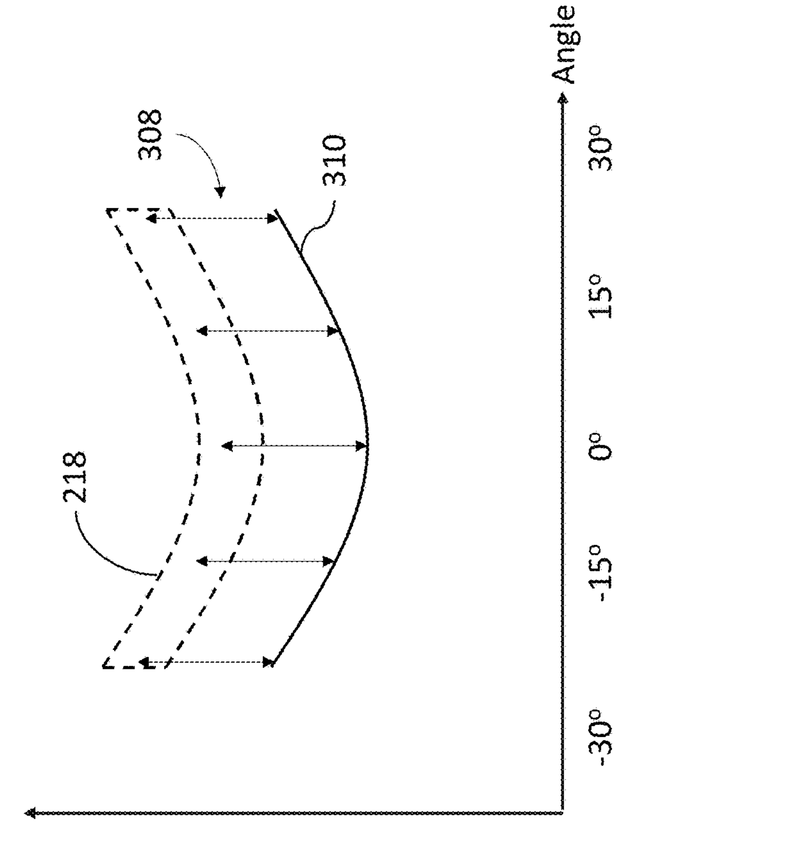
FIG. 3A illustrates a front hazard sensor at an incorrect pitch angle according to an exemplary embodiment.

FIG. 3A illustrates a side view, with respect to the X-Z plane as shown by reference coordinates 310, of a first front hazard sensor 202 at a correct pitch angle alpha (α), as previously illustrated in FIG. 2A, and a second front hazard sensor 308 at an incorrect pitch angle alpha prime (α') according to an exemplary embodiment. Sensor 308 may comprise some, none, or all of the features of sensor units 114 previously illustrated in FIG. 1A. Sensor 308, orientated at incorrect pitch angle alpha prime (α'), may perceive the floor 304 to be closer than as perceived by sensor 202 since the incorrect pitch angle alpha prime (α') is of lesser magnitude than correct pitch angle alpha (α). As illustrated in FIG. 3A, sensor 302 may be at a correct orientation with respect to yaw and roll axis and may only be at an incorrect pitch angle alpha prime (α').

According to at least one non-limiting exemplary embodiment, incorrect pitch angle alpha prime (α') may be of larger magnitude than correct pitch angle alpha (α), wherein a sensor 302 may perceive floor 304 to be further away than as perceived by sensor 202.

FIG. 3B illustrates a sensor reading from sensor 302, previously illustrated in FIG. 3A, being compared to a threshold margin of error 218 to determine if an error in the mounting of sensor 302 is present, according to an exemplary embodiment. As previously illustrated in FIG. 3A, sensor 302 is positioned on a robot 102 at an incorrect pose, with respect to sensor 202 at a default pose, thereby causing measurements 310 to be outside of the threshold margin of error 312. The threshold margin of error 218 may be implemented to account for changes to distances measured by the sensor 302 due to noise of the sensor 302, small bumps in a floor, and other small perturbations, which may cause distances measured by the sensor 302 to vary but are not indicative of a cliff. As illustrated in FIG. 3B, errors 308 may be measured between the center of the threshold margin of error 312 and the measurement 310 by sensor 302. According to at least one non-limiting exemplary embodiment, error 308 may be measured between the upper or lower bounds of the threshold margin of error 312.

Errors 308 may be used to determine if an error is present in the mounting of sensor 302 (e.g., mounted at an incorrect pitch angle) based on a $L_1$-norm and/or $L_2$-norm error measurements. The $L_1$-norm error measurement may be implemented using the following Eqn. 1:

$$L_1 = \sum_{i=1}^{I} |d_i| \quad \text{(Eqn. 1)}$$

The $L_1$ error may comprise a summation of a magnitude of all errors 308, wherein each error 308 comprises a discrepancy between an expected value and a measured value for each point measured by the sensor 202. The expected value comprising a value of the distance measurement 310 if the sensor 302 is measuring a flat floor and positioned at the correct angle alpha (α). Index i may comprise an integer value denoting an i'th error 302 of a total of I errors 308, wherein measurement 310 may be represented using I discrete points. For example, as illustrated in FIG. 3A, five (5) errors 308 are illustrated wherein index I may have a value of five (5) and index i may correspond to individual distance measurements at eight-degree (8°) increments across the field of view of the sensor 302 which senses a floor in front of the sensor 302.

The $L_2$-norm error measurement may be implemented using the following Eqn. 2:

$$L_2 = \sum_{i=1}^{I} (d_i)^2 \quad \text{(Eqn. 2)}$$

The $L_1$-norm and $L_2$-norm error measurements may be taken at discrete points in time and may be further used to determine an error E parameter over a period of time T following Eqn. 3:

$$E = \frac{1}{T} * \sum_{t=0}^{T} (A * L_1[t] + B * L_2[t]) \quad \text{(Eqn. 3)}$$

The coefficients A and B may correspond to weights applied by a controller 118 to the $L_1$-norm and $L_2$-norm error measurements, wherein coefficients A and B may represent any real number (e.g., 0, ±0.1, ±0.25, ±3, etc.). The $L_1$-norm and $L_2$-norm error measurements may be taken at discrete time intervals t, wherein time t may represent any time increment for measuring the $L_1$-norm and $L_2$-norm errors (e.g., t may correspond to a 1 second, 0.1 second, etc. interval). Error parameter E may be further averaged over time T, wherein time T may comprise the total runtime of a robot and may be unbounded (e.g., time T may be continuously increased when the robot is operating). Advantageously, averaging the weighted sums of the $L_1$-norm and $L_2$-norm error measurements may reduce the impact of outlier measurements effecting the error parameter E, as further illustrated in FIG. 6. Error parameter E may then be compared to a prescribed threshold, wherein, upon error parameter E meeting or exceeding the threshold, an error in the mounting of sensor 302 may be determined.

According to at least one non-limiting exemplary embodiment, Eqn. 3 may further comprise calculations of higher-order measurement error calculations (e.g., $L_3$-norm) or different error calculations (e.g., RMS error calculations), wherein each of these additional terms may further be multiplied by additional coefficients, similar to coefficients A and B to be applied by a controller 118. These error measurements may still be averaged over the period of time T to account for outliers, as further illustrated in FIGS. 6A-B. The period of time T may correspond to a set period of time (e.g., 200 seconds, 10 minutes, etc.) wherein the value of error parameter E may be reset at the end of each period of time T. For example, T may be two (2) minutes, for example, wherein the value of error parameter E may be determined from measurement errors determined between a present time and two (2) minutes prior to the present time.

By summing up all errors over time and averaging over the time, outlier measurements, or measurements of walls, cliffs, etc., will be averaged out as the time increases. For example, a robot 102 may utilize a front hazard sensor 202 to detect a wall and subsequently turn away from the wall, wherein the $L_1$, $L_2$ errors may be large temporarily, yielding a temporary increase in error parameter E, but the error parameter E will slowly decrease as time T increases. As another example, the front hazard sensor 202 may detect a cliff, thereby causing measurements from the sensor 202 to appear similar to FIG. 2C, but with measurement 216 being above the threshold 218. Temporarily, the error E will increase as the sensor 202 detects the cliff but, if the robot 102 moves away from the cliff, the error E will decrease over time. If the $L_1$, $L_2$ errors become nonzero due to a pose of the front hazard sensor 202 becoming misaligned, however, the errors will accumulate and increase a value of E above a threshold value after a certain time, wherein larger misalignment may cause the error E to exceed the threshold faster than small misalignments.

Figure 4B:
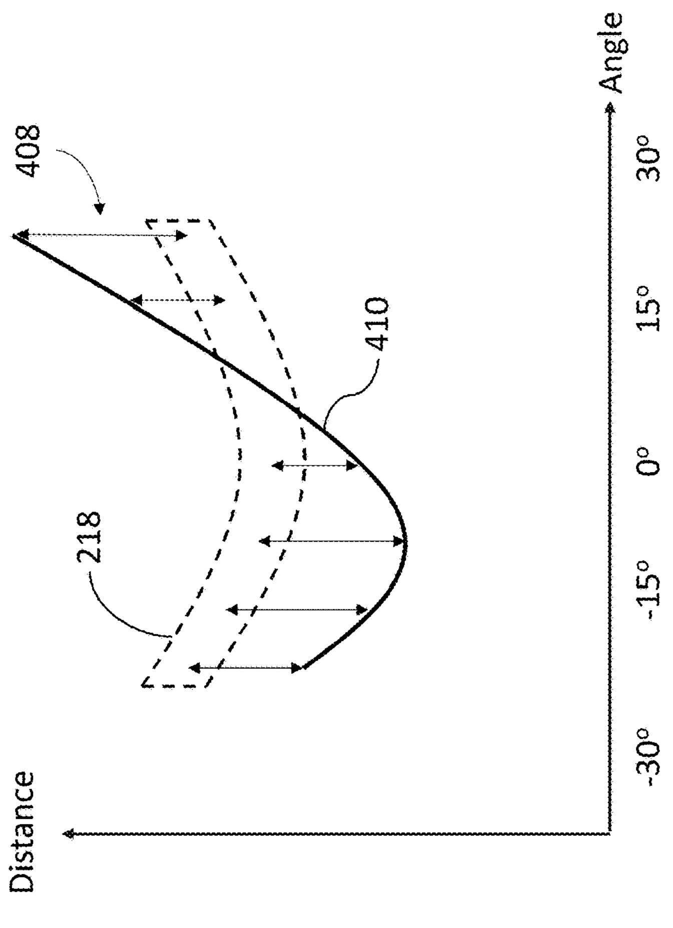
FIG. 4B illustrates a sensor reading of the front hazard sensor illustrated in FIG. 4A being compared to an expected reading, within a margin of error, of a properly mounted front hazard sensor according to an exemplary embodiment.
Figure 4A:
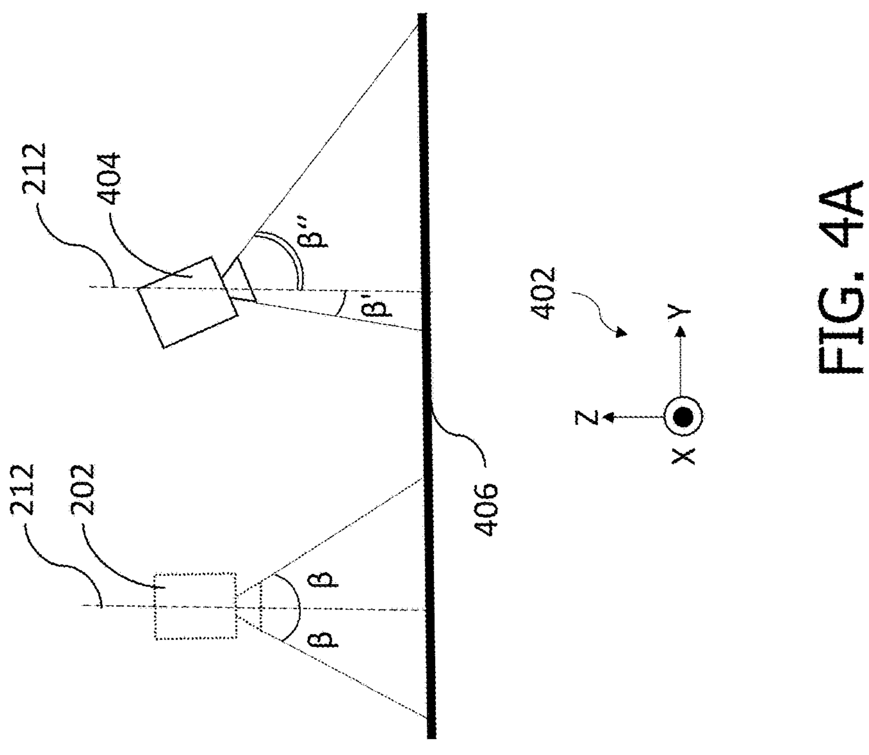
FIG. 4A illustrates a front hazard sensor at an incorrect yaw angle according to an exemplary embodiment.

FIG. 4A illustrates a front view, with respect to the Y-Z plane as shown by reference coordinates 402, of a front hazard sensor 202 at a correct yaw angle (β) and a front hazard sensor 404 at an incorrect yaw angle, shown by angles beta prime (β') and beta double prime (β") with respect to a vertical axis of reference 212 previously illustrated in FIG. 2B, according to an exemplary embodiment. Sensor 404 may comprise some, different, or all of the features of sensor units 114 previously illustrated in FIG. 1A capable of measuring distances (e.g., a LiDAR or depth camera sensor) and may be mounted on a robot 102 (not shown). Sensor 404, as illustrated in FIG. 4A, may be orientated along a correct roll and pitch angle and may only comprise an error in the yaw angle for simplicity.

FIG. 4B illustrates a sensor reading 410, from sensor 404 previously illustrated in FIG. 4A, being compared to a threshold margin of error 218 to determine if an error in the mounting of sensor 404 is present, according to an exemplary embodiment. The shape of measurement 410 may be distorted as one side of sensor 404 (e.g., −20° side) may perceive floor 406 to be closer than as perceived by the other side (e.g., +20° side) of the sensor reading 410 due to an error in the yaw angle of the mounting of sensor 404 as illustrated in FIG. 4A above. Error parameter E may be calculated from errors 408 using Eqn. 1-3 above and compared to a prescribed threshold to determine an error is present in the pose of sensor 404, further illustrated below in FIG. 8.

Figure 5A:
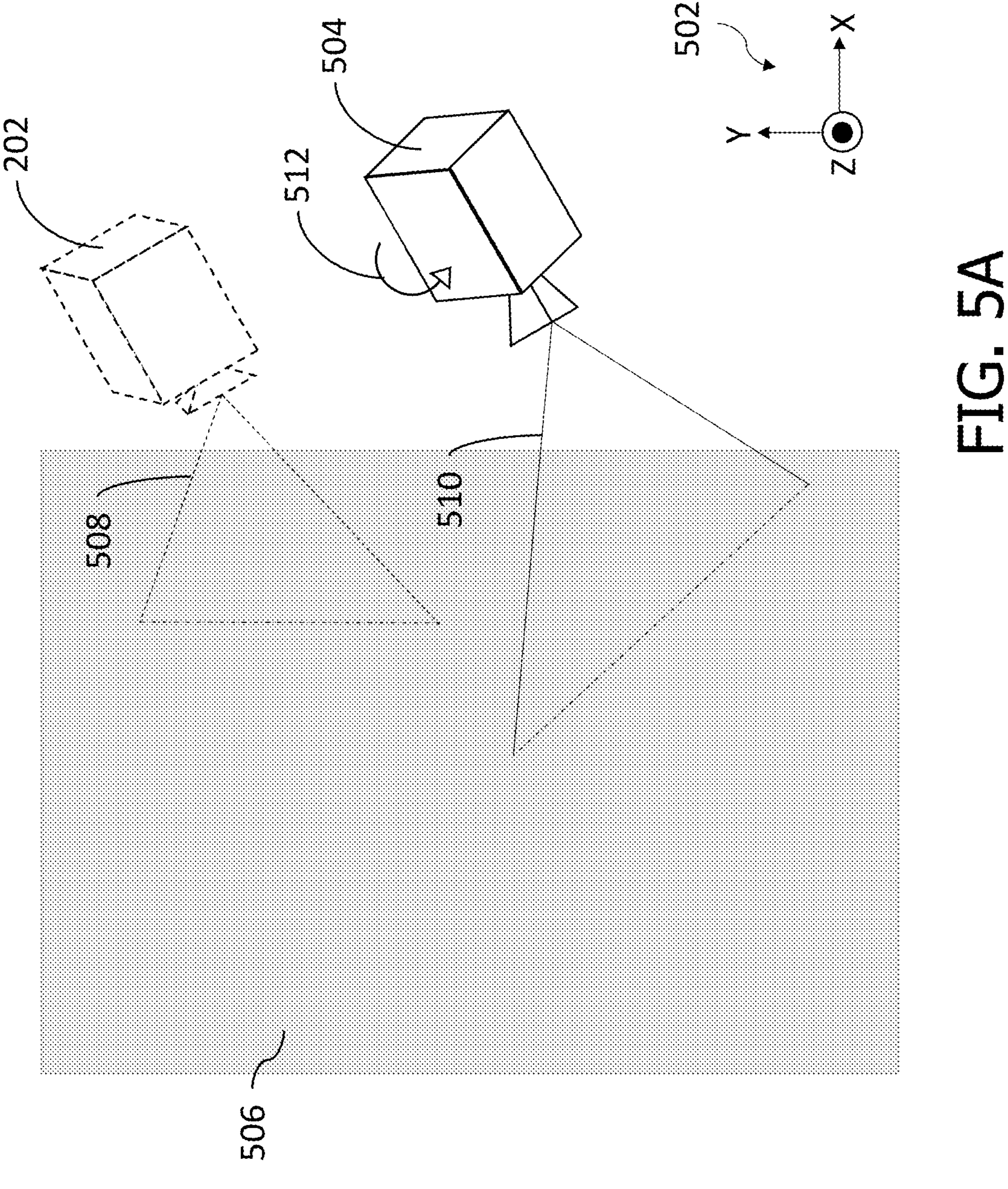
FIG. 5A illustrates a front hazard sensor at an incorrect roll angle according to an exemplary embodiment.

FIG. 5A illustrates a top view, with respect to the X-Y plane as shown by reference coordinates 402, of a front hazard sensor 202 at a correct roll angle and a front hazard sensor 504 at an incorrect roll angle as shown by rotation 512, according to an exemplary embodiment. Sensor 504 may comprise some, different, or all of the features of sensor units 114 capable of measuring distances as previously illustrated in FIG. 1A and may be mounted on a robot 102 (not shown). Sensor 504, as illustrated in FIG. 5A, may be orientated along a correct yaw and pitch angle and may only comprise an error in the roll angle for simplicity. As illustrated in FIG. 5A, sensor vision lines 508 of sensor 202 may intersect the floor 506 along the Y axis, whereas sensor vision lines 510 of sensor 504, comprising an incorrect roll angle in its pose, may intersect the floor 506 at a skewed angle causing an error in sensor reading 514 of sensor 504, as further illustrated in FIG. 5B.

Figure 5B:
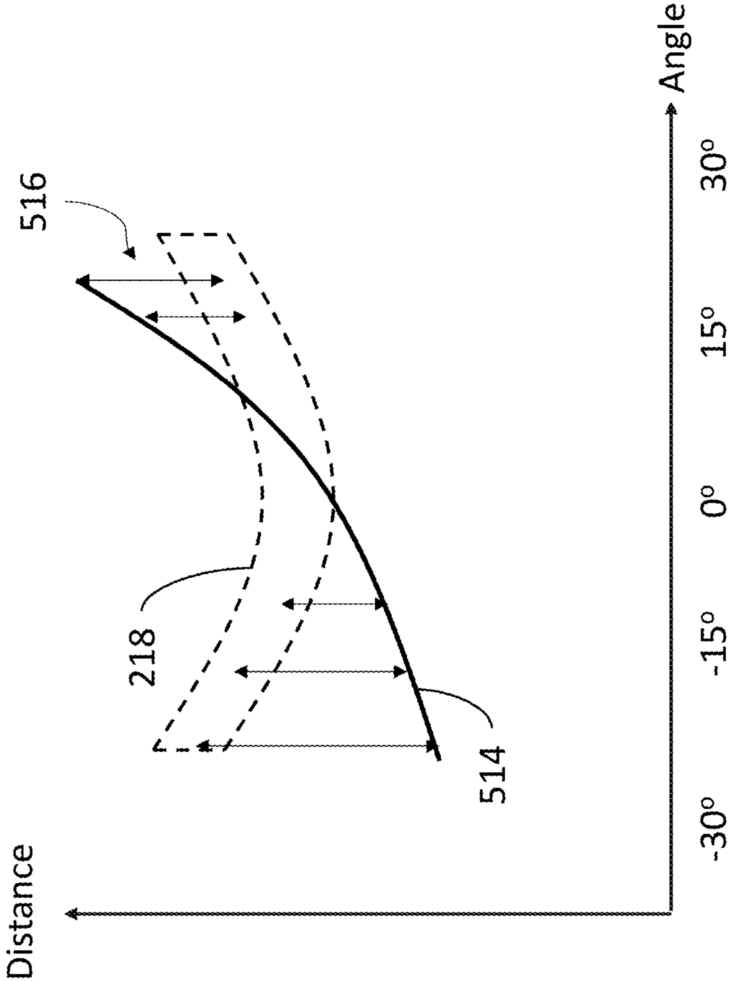
FIG. 5B illustrates a sensor reading of the front hazard sensor illustrated in FIG. 5A being compared to an expected reading, within a margin of error, of a properly mounted front hazard sensor according to an exemplary embodiment.

FIG. 5B illustrates a sensor reading 514 from sensor 504, previously illustrated in FIG. 5A, being compared to a threshold 516 to determine if an error of a pose of sensor 504 is present, according to an exemplary embodiment. The shape of measurement 514 may be skewed as one side of sensor 504 (e.g., −20°) may perceive floor 506 to be closer than as perceived by the other side (e.g., +20°) of the sensor reading 514 due to an error in the roll angle of the mounting of sensor 504. Error parameter E may be calculated based on errors 516 using Eqn. 1-3 above and compared to a prescribed threshold to determine an error is present in the pose of sensor 504, as further illustrated below in FIG. 8. It will be appreciated that measurements from sensor 202 illustrated in FIG. 5A above may fall within the threshold 218 as the sensor 202 comprises a default or correct pose. Additionally, only five errors 516 are illustrated, however one skilled in the art may appreciate that measurement 514 may comprise a plurality of points therein, wherein errors 516 may be determined for each point of the plurality of points which form measurement 514, many of which are omitted for clarity.

According to the non-limiting exemplary embodiments illustrated above with respect to FIG. 3-5, error measurements 308, 408, and 516 are not measured at angular positions within the measurement range (e.g., ±20°) where the sensor readings 310, 410, and 514 are within the acceptable margin of error threshold 218. According to another non-limiting exemplary embodiment, the measurement errors 308, 408, 516 may be measured at the locations within the acceptable margin of error threshold 218 and may be taken between the respective sensor measurements 310, 410, 514 and the average/center, upper bound, or lower bound of the margin of error threshold 218.

According to at least one non-limiting exemplary embodiment, a sensor may comprise an error in one, some, or all orientations as illustrated above in FIG. 3-5 to varying degrees. For example, a sensor may be correctly orientated along its roll axis but may comprise mounting errors along its yaw and pitch axis, for example. Similarly, a pose of a sensor may be misaligned with respect to a default pose in translational coordinates (x, y, z) in addition to misalignment in rotational coordinates (yaw, pitch, roll).

FIG. 6A illustrates a top view of a robot 102 navigating a route 602 nearby a cliff 604, the route 602 comprising a sharp turn, within an environment 600, according to an exemplary embodiment. At time $t_a$ the robot 102 may reach point 606-A, wherein point 606-A illustrates the point where a front hazard sensor 608 of the robot 102, shown in FIG. 6B, first detects the cliff 604. At later time $t_b$ the robot 102 may reach point 606-B, further along route 602 than point 606-A, at the location of the sharp turn. At a later time $t_c$ the robot 102 may reach point 606-C along route 602 beyond the sharp turn, wherein the front hazard sensor 608 no longer detects the cliff 604 in front of the robot 102.

FIG. 6B illustrates a side view, with respect to the X-Z plane as shown by reference coordinates 610, of a front hazard sensor 608 at a correct orientation, shown by angle alpha (α) with respect to a vertical reference axis 208 previously illustrated in FIG. 2A, detecting cliff 604 at a distance illustrated by sensor vision line 612 according to an exemplary embodiment. Front hazard sensor 608 may be configured to only measure a distance from the sensor 608 to a floor to determine the presence of cliffs or sharp edges, indicated by a sudden increase in a distance measurement illustrated by sensor vision line 612. Upon the robot 102 approaching cliff 604, the front hazard sensor 608 may determine a distance measurement to be larger than expected and thereby causing error parameter E to increase in value over a time when the cliff 604 is detected. As the robot 102 navigates from location 606-A to location 606-C, as illustrated in FIG. 6A, the front hazard sensor 608 may only generate an error parameter E to be non-zero or of substantial magnitude for a brief duration (e.g., from $t_a$ to $t_b$) as front hazard sensor 608 may only observe the cliff 604 for a brief duration.

Figure 6C:
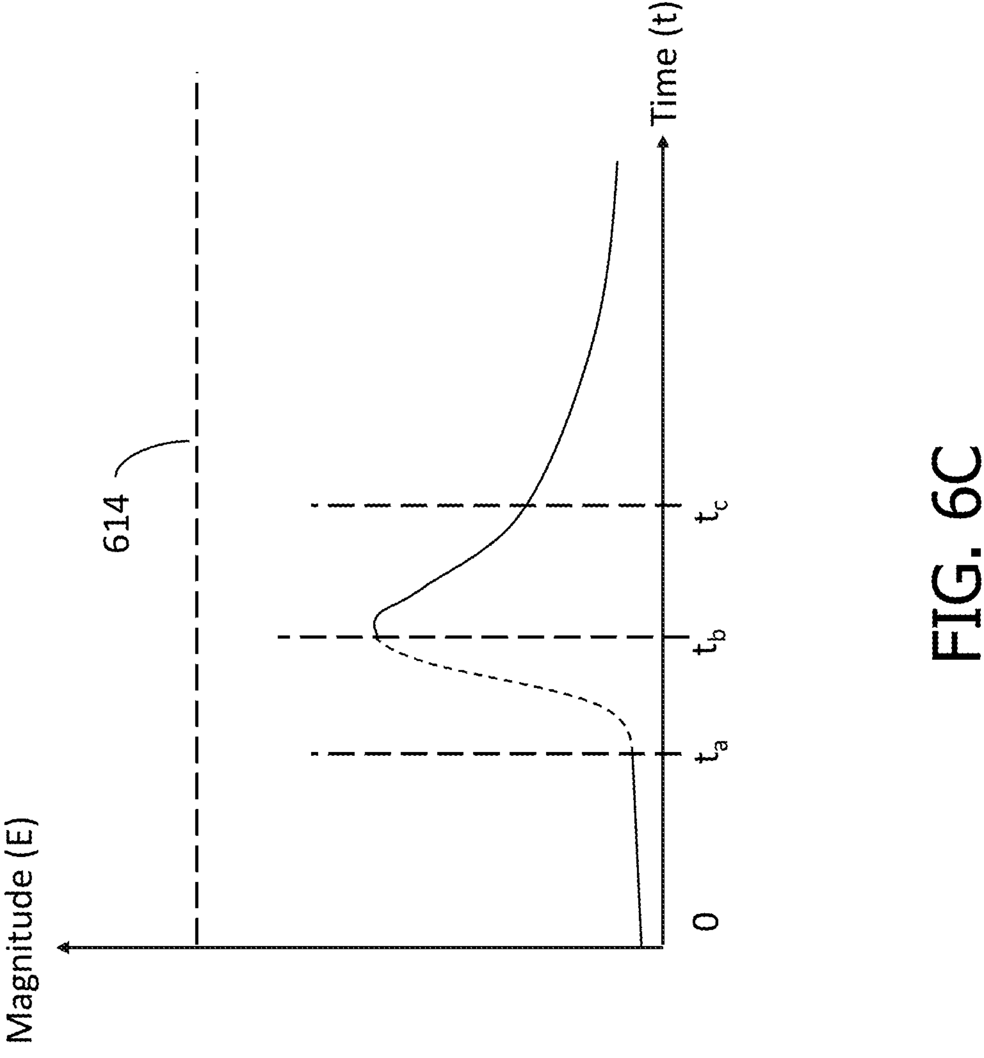
FIG. 6C illustrates a magnitude reading of an error parameter over time due to objects within the environment illustrated in FIG. 6A.

FIG. 6C illustrates the value of an error parameter E over time, based on Eqn. 3 above, as a robot 102 navigates route 602, comprising a sharp turn near a cliff 604 as previously illustrated in FIG. 6A-B, according to an exemplary embodiment. Measurements of error parameter E to the left of time $t_a$, corresponding to robot 102 navigating along route 602 at locations prior to point 606-A, may comprise little to no measurement error if sensor 608 is operating properly (e.g., with no obstacles such as cliff 604 and correctly mounted on the robot 102), therefore causing error parameter E to be of zero or of small magnitude. At time $t_a$, sensor 608 may determine a distance measurement to be of larger magnitude than the expected measurement due to cliff 604, causing an increase of the magnitude of error parameter E at time $t_a$ based on Eqn. 3 above. That is, detection of cliff 604 causes measurements by the front hazard sensor 202 to deviate away from the threshold 218, or expected value, illustrated in FIG. 2 above, thereby causing error parameter E to increase. Robot 102 may execute the sharp turn at time $t_b$ at location 606-B, wherein, upon executing the turn, sensor 608 may return to measuring the expected distance measurement (e.g., between sensor 608 and the floor). Accordingly, the magnitude of error parameter E may decrease over time as the magnitude of error parameter E is continuously averaged over an increasing time period, T, according to Eqn. 3, causing the magnitude of error parameter E to decrease as robot 102 continues to operate within environment 600 at time $t_c$. Advantageously, this averaging of error parameter E over time, as shown in Eqn. 3 above, may reduce the impact of outliers (e.g., values of error parameter E between $t_a$ and $t_b$) when determining the magnitude of the error parameter E.

According to at least one non-limiting exemplary embodiment, cliff 604 may be illustrative of a wall or raised feature of the floor, wherein sensor vision line 612 may generate a distance measurement of smaller magnitude than a distance measurement between a sensor 608 and a floor. Error parameter E may behave the same or in a substantially similarly manner as illustrated in FIG. 6C to the detection of a cliff as the error calculations of Eqn. 1-3 are based on the magnitude or absolute value of the measurement errors 308, 408, and 518 illustrated above in FIG. 3-5. One skilled in the art may appreciate that a front hazard sensor 202 configured to sense a floor space in front of a robot 102 along its direction of travel may also be used to detect walls, tables, or other objects in front of the robot 102 upon the front hazard sensor 202 measuring a smaller distance measurement than expected. The expected distance measurement corresponds to a distance between the sensor 202 and an otherwise flat floor.

According to at least one non-limiting exemplary embodiment, controller 118 of a robot 102 may be configured to determine outliers of error parameter E caused by objects within an environment based on a computer-readable reference map of environment 600 stored in memory 120. Upon referencing the computer-readable reference map of environment 600, the robot 102 may determine cliff 604 will be detected by a front hazard sensor 608 between times $t_a$ and $t_b$ and may therefore disregard (e.g., remove from the summation of Eqn. 3) values of error parameter E between times $t_a$ and $t_b$. According to this exemplary embodiment, the value of error parameter Eat time $t_c$ may be substantially smaller than as illustrated in FIG. 6C once the values of error parameter E have been disregarded between times $t_a$ and $t_b$.

According to another non-limiting exemplary embodiment, controller 118 may, upon determining error parameter E will increase or has increased due to environmental objects, reduce the magnitude of coefficients A and B, shown in Eqn. 3, for a brief duration during or after detection of an object by sensor 608, thereby reducing the magnitude of error parameter E caused by the object.

Threshold 614 may correspond to a prescribed pose error detection threshold wherein, upon error parameter E reaching or exceeding threshold 614, robot 102 may determine an error is present in the pose of the sensor 608 on the robot 102 and may, for example, power off or call for human assistance. According to at least one non-limiting exemplary embodiment, threshold 614 may be dynamically adjusted over time by robot 102 to account for known environmental objects (e.g., cliff 604) detected by front hazard sensor 608 causing an increase in error parameter E.

Figure 7:
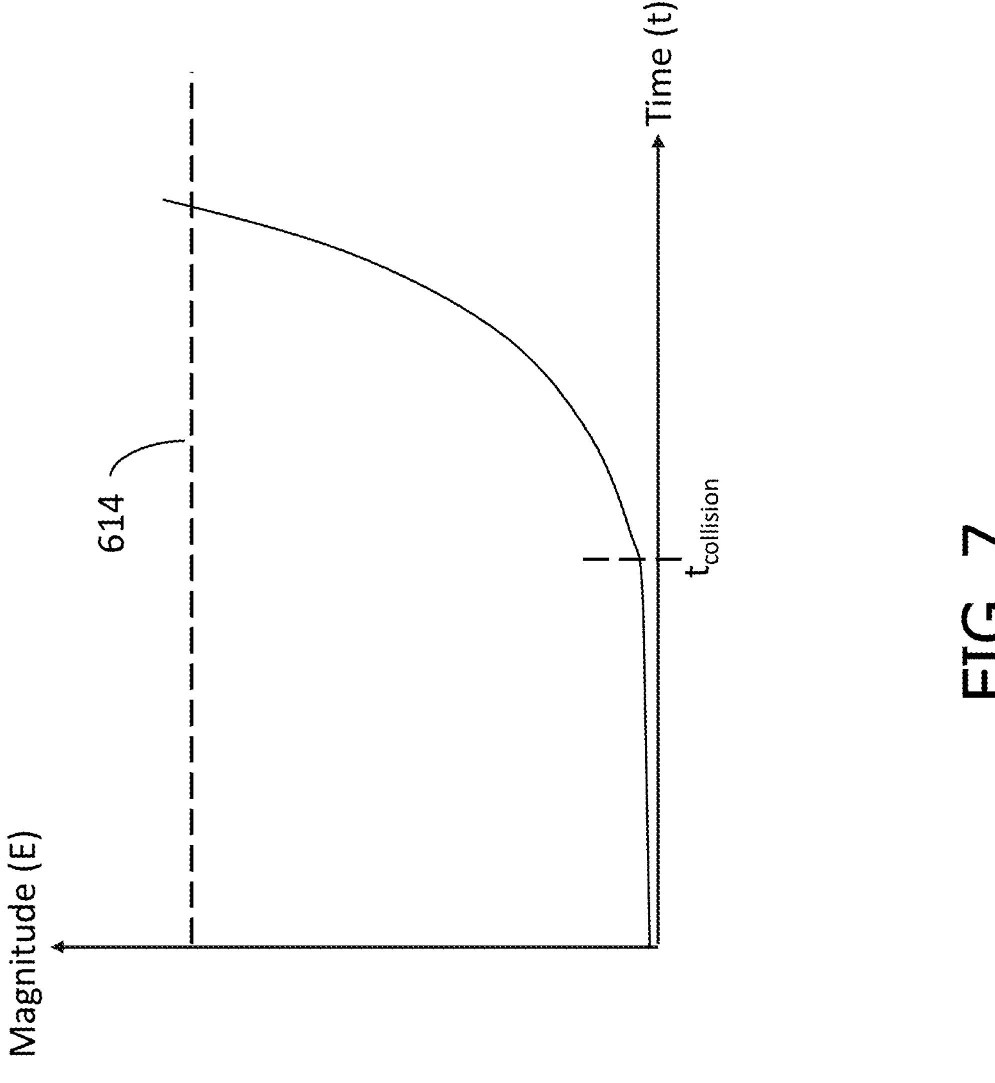
FIG. 7 illustrates a magnitude reading of an error parameter over time of an incorrectly mounted front hazard sensor according to an exemplary embodiment.

FIG. 7 illustrates an error parameter E value increasing after a robot 102, comprising a front hazard sensor, experiences a collision with a human or object at time $t_{collision}$ causing the pose of the front hazard sensor 202 to change from a default pose to a different pose (e.g., as shown in FIGS. 3B, 4A and 5A), according to an exemplary embodiment. In some instances, the pose of the front hazard sensor 202 may be altered while the robot 102 is powered off (e.g., during storage), wherein time $t_{collision}$ may correspond to the moment the robot 102 is powered on and begins to collect data from the sensor 202. After $t_{collision}$, error parameter E may experience a gradual increase over time as the summation of Eqn. 3 may increase in magnitude despite the averaging over time T, causing error parameter E to eventually exceed threshold 702 and cause robot 102 to determine an error in the mounting of the front hazard sensor.

Unlike the exemplary embodiment illustrated in FIG. 6A-C, wherein measurements by the front hazard sensor 202 deviate from threshold 218 only temporarily due to an object or cliff, the collision may cause a change in the pose of the sensor 202 causing $L_1$, $L_2$ errors of Eqn. 1, 2 above to become non-zero always, regardless of objects, thereby yielding a constant increase in error parameter E. In the exemplary embodiment illustrated in FIG. 6A-C, the error is non-zero only during a brief duration in time, causing a brief increase in the magnitude of error parameter E followed by a gradual decrease of error parameter E due to the averaging over time T as additional values of the $L_1$-norm and $L_2$-norm may be zero or negligibly small after $t_b$.

It is appreciated by one skilled in the art that a pose error of a front hazard sensor may be caused by a plurality of factors such as, but not limited to, wear and tear over time, collisions with obstacles, or faulty mounting apparatuses wherein the mounting error caused by a collision in FIG. 7 is exemplary and not intended to be limiting.

Figure 8:
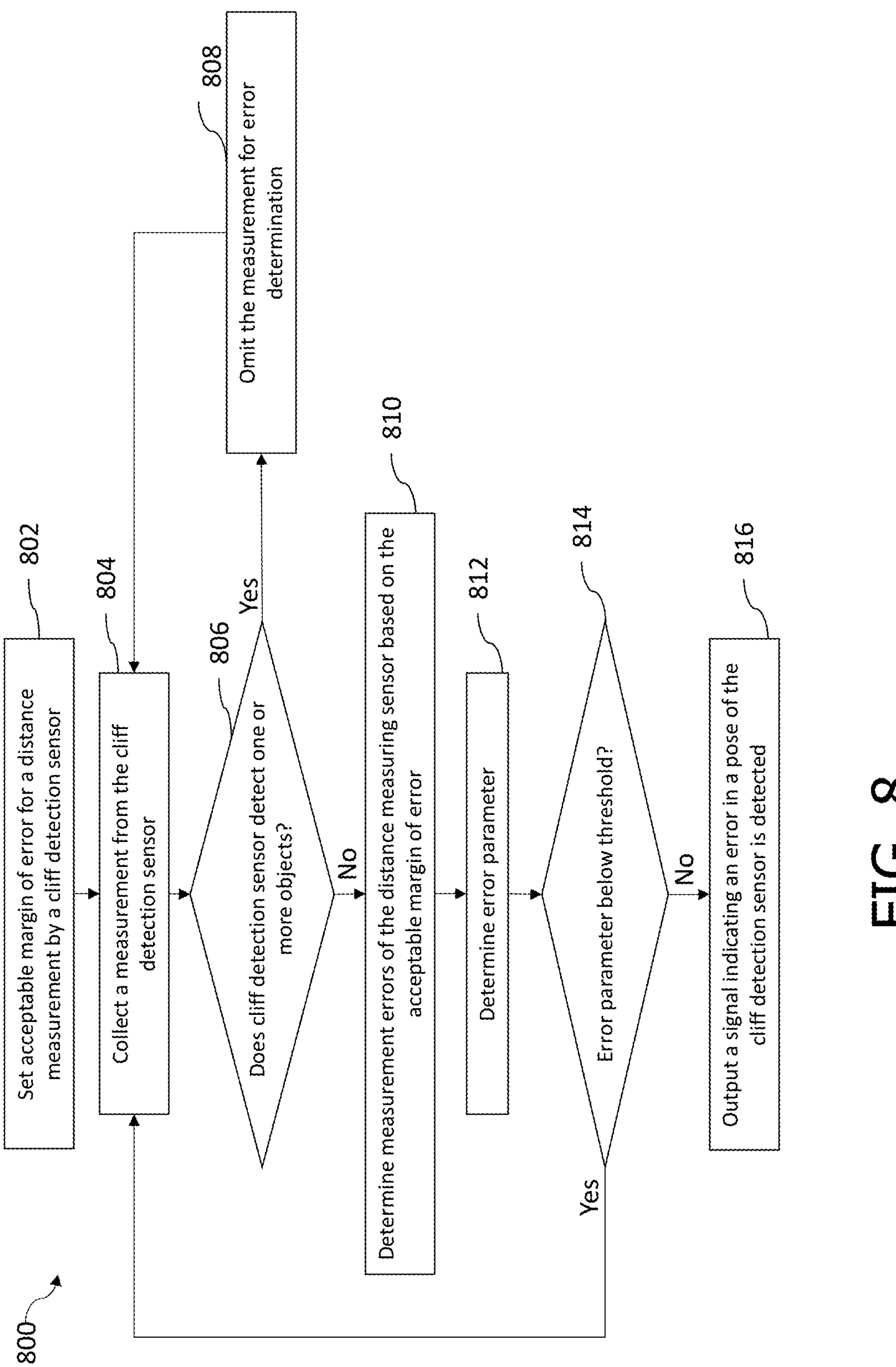
FIG. 8 illustrates a process flow diagram of a method for a robot comprising a front hazard sensor to detect an error in the mounting of the front hazard sensor according to an exemplary embodiment.

FIG. 8 illustrates a method 800 for a controller 118 of a robot 102 to determine an error in the mounting of a front hazard sensor 202 positioned on the robot 102, according to an exemplary embodiment. It is appreciated that any steps of method 800 are effectuated by the controller 118 executing computer-readable instructions from memory 120.

Block 802 comprises the controller 118 setting an acceptable margin of error 218 for a distance measurement by a front hazard sensor 202. The acceptable margin of error 218 may be centered about an expected distance measurement of a flat floor by the front hazard sensor 202 at its default pose. The range of distances of the margin of error 218 may be based on, without limitation, noise of the sensor 202, small bumps in a floor (e.g., as robot 102 moves over the bumps), or other small perturbations which may cause distance measurements from the sensor 202 to deviate slightly from the expected distance measurement. In some embodiments, the acceptable margin of error 218 may be predetermined by a manufacturer of the robot 102. In some embodiments, the acceptable margin of error 218 may be measured during navigation within an environment, wherein the range of distances of the acceptable margin of error 218 may be based on average deviation (e.g., due to bumps in a floor) of the measurement from the sensor 202 from the expected distance measurement during the navigation.

Block 804 comprises the controller 118 collecting a measurement from the front hazard sensor 202. The measurement may comprise, for example, a single scan across a field of view of the sensor 202 if the sensor 202 comprises a planar LiDAR. In some embodiments, the measurement may comprise a depth image if the sensor 202 is a depth camera.

Block 806 comprises the controller 118 determining if the front hazard sensor 202 is detecting one or more objects. Detection of one or more objects by the front hazard sensor 202 may cause measurements by the sensor 202 to deviate from the acceptable margin of error 218, thereby causing error parameter E to increase, as illustrated in FIG. 6A-C above. It is appreciated that detection of an object by the front hazard sensor 202 may further comprise detection of the object within a specified portion of a field of view of the sensor 202 as only the specified portion of the field of view may be utilized for cliff detection (e.g., the portion may encompass a region directly in front of the robot 102), wherein the remaining portion may be utilized for mapping, localization, and other functions of the robot 102.

Upon controller 118 determining an object is detected by the sensor 202, the controller 118 moves to block 808 to omit the measurement from calculation of the error parameter E. That is, the controller 118 may determine that any measurement error (e.g., based on equations 1-2 above) may be caused by an object and not by a misalignment of the front hazard sensor 202, wherein the measurement errors may be omitted.

Upon controller 118 determining that no objects are detected by the front hazard sensor 202, the controller 118 may move to block 810.

Block 810 comprises the controller 118 determining at least one measurement error of the front hazard sensor 202 based on the acceptable margin of error 218. The at least one measurement error may comprise at least one of an $L_1$, $L_2$, etc. error calculation (e.g., using equations 1, 2 above). Measurement errors are graphically illustrated in FIG. 3-5 by errors 308, 408, 516 respectively. That is, the controller 118 calculates at least one numeric value based on a deviation of the measurement from the acceptable margin of error 218.

Block 812 comprises the controller 118 determining an error parameter E. The error parameter E may be calculated using equation 3 above, or similar equation. The error parameter E may be based on the at least one measurement error determined in block 810 and prior values of the at least one measurement error calculated for prior measurements from the front hazard sensor 202. As illustrated by equation 3 above, error parameter E is calculated using a running sum of the measurement errors divided by or normalized with respect to a total runtime T, the total run time comprising a duration in time in which the running sum is calculated. In some embodiments, the runtime may be bound to a certain value, wherein the value of the error parameter E may be reset upon exceeding the runtime value. In some embodiments, the running sum may be unbound with respect to the runtime, wherein the error parameter E may be calculated until the robot 102 stops navigating (e.g., when robot 102 is powered off, completes a route, etc.).

Block 814 comprises the controller 118 comparing the value of the error parameter E to a prescribed threshold 614. Upon the error parameter E exceeding the prescribed threshold 614, controller 118 may move to block 816. Upon the error parameter E not exceeding the prescribed threshold 614, the controller 118 returns to block 804.

Block 816 illustrates the controller 118 determining an error is present in a pose of the front hazard sensor based on the error parameter E exceeding the prescribed threshold 614. The controller 118 may output a signal indicating the error in the pose of the front hazard sensor 202 is detected. In some embodiments, the signal may be output to actuator units 108 to stop the robot 102. In some embodiments, the signal may be output to a separate device, such as a cell phone of an operator of the robot 102, wherein the signal comprises an alert (e.g., a text message) to the device (e.g., "Robot 102 front hazard sensor error detected, calibration required."). In some embodiments, the signal may be output to servomotors configured to adjust or change a pose of the front hazard sensor 202. In some embodiments, the signal may configure the controller 118 to execute instructions to determine a digital transformation which manipulates data from the front hazard sensor 202 to minimize the error parameter E.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various exemplary embodiments, it will be understood that various omissions, substitutions, and changes in the form and details of the device or process illustrated may be made by those skilled in the art without departing from the disclosure. The foregoing description is of the best mode presently contemplated of carrying out the disclosure. This description is in no way meant to be limiting, but rather should be taken as illustrative of the general principles of the disclosure. The scope of the disclosure should be determined with reference to the claims.

While the disclosure has been illustrated and described in detail in the drawings and foregoing description, such illustration and description are to be considered illustrative or exemplary and not restrictive. The disclosure is not limited to the disclosed embodiments. Variations to the disclosed embodiments and/or implementations may be understood and effected by those skilled in the art in practicing the claimed disclosure, from a study of the drawings, the disclosure and the appended claims.

It should be noted that the use of particular terminology when describing certain features or aspects of the disclosure should not be taken to imply that the terminology is being re-defined herein to be restricted to include any specific characteristics of the features or aspects of the disclosure with which that terminology is associated. Terms and phrases used in this application, and variations thereof, especially in the appended claims, unless otherwise expressly stated, should be construed as open ended as opposed to limiting. As examples of the foregoing, the term "including" should be read to mean "including, without limitation," "including but not limited to," or the like; the term "comprising" as used herein is synonymous with "including," "containing," or "characterized by," and is inclusive or open-ended and does not exclude additional, unrecited elements or method steps; the term "having" should be interpreted as "having at least"; the term "such as" should be interpreted as "such as, without limitation"; the term 'includes" should be interpreted as "includes but is not limited to"; the term "example" is used to provide exemplary instances of the item in discussion, not an exhaustive or limiting list thereof, and should be interpreted as "example, but without limitation"; adjectives such as "known," "normal," "standard," and terms of similar meaning should not be construed as limiting the item described to a given time period or to an item available as of a given time, but instead should be read to encompass known, normal, or standard technologies that may be available or known now or at any time in the future; and use of terms like "preferably," "preferred," "desired," or "desirable," and words of similar meaning should not be understood as implying that certain features are critical, essential, or even important to the structure or function of the present disclosure, but instead as merely intended to highlight alternative or additional features that may or may not be utilized in a particular embodiment. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. The terms "about" or "approximate" and the like are synonymous and are used to indicate that the value modified by the term has an understood range associated with it, where the range may be ±20%, ±15%, ±10%, ±5%, or ±1%. The term "substantially" is used to indicate that a result (e.g., measurement value) is close to a targeted value, where close may mean, for example, the result is within 80% of the value, within 90% of the value, within 95% of the value, or within 99% of the value. Also, as used herein "defined" or "determined" may include "predefined" or "predetermined" and/or otherwise determined values, conditions, thresholds, measurements, and the like.

What is claimed is:

1. A method for determining an error in a pose of a front hazard sensor, comprising:

determining a margin of error based on an expected measurement from the front hazard sensor at a default pose, the front hazard sensor coupled to a robot;

collecting a plurality of distance measurements from the front hazard sensor as the robot navigates a route through an environment over a duration in time;

calculating measurement errors of the front hazard sensor based on a magnitude of a discrepancy between the margin of error and each of the plurality of collected distance measurements;

determining an error parameter based on a normalized summation of average values of the calculated measurement errors over the duration in time;

determining an error in mounting of the front hazard sensor based on the error parameter meeting or exceeding a threshold; and outputting a signal indicative of the determined error, wherein the signal is communicated to one or more actuator units to stop the robot.

2. The method of claim 1, further comprising:

determining, based on a computer readable map of the environment, locations along the route traveled by the robot where value of the error parameter increases due to objects in the environment; and omitting measurement errors for distance measurements which detect the objects based on the computer readable map.

3. The method of claim 1, further comprising:

adjusting the threshold or value of the error parameter based on predetermined objects within the environment, the predetermined objects configured to cause an increase in value of the error parameter.

4. The method of claim 1, wherein the signal is outputted to a device, the device is configured to indicate detection of the error in the pose of the front hazard sensor.

5. A non-transitory computer readable storage medium comprising a plurality of computer readable instructions stored thereon, that when executed by a processor, configure the processor to:

determine a margin of error based on an expected measurement from a front hazard sensor at a default pose on a robot;

collect a plurality of distance measurements from the front hazard sensor at an operating pose as the robot navigates a route through an environment over a duration in time;

calculate measurement errors of the front hazard sensor based on a magnitude of a discrepancy between the margin of error and each of the plurality of collected distance measurements;

determine an error parameter based on a normalized summation of average values of the calculated measurement errors and the duration in time;

determine an error in mounting of the front hazard sensor based on the error parameter meeting or exceeding a threshold; and output a signal indicative of the determined error, wherein the signal is communicated to one or more actuator units to stop the robot.

6. The non-transitory computer readable storage medium of claim 5, wherein the processor is further configured to execute the computer readable instructions to, determine, based on a computer readable map of the environment, locations along the route traveled by the robot where value of the error parameter increases due to objects in the environment; and omit errors for distance measurements which detect the objects based on the computer readable map.

7. The non-transitory computer readable storage medium of claim 5, wherein the processor is further configured to execute the computer readable instructions to adjust the threshold or value of the error parameter based on predetermined objects within the environment, the predetermined objects configured to cause an increase in value of the error parameter value.

8. The non-transitory computer readable storage medium of claim 5, wherein the signal is outputted to a device, the device configured to indicate detection of the error in the operating pose of the front hazard sensor.

9. A robotic system, comprising:

a non-transitory computer readable storage medium comprising computer readable instructions stored thereon; and at least one processor configured to execute the computer readable instructions to, determine a margin of error for a measurement of a front hazard sensor mounted to the robotic system at a default pose;

collect a plurality of distance measurements from a front hazard sensor as the robotic system navigates a route through an environment over a duration in time;

determine measurement errors of the front hazard sensor based on a magnitude of a discrepancy between the margin of error and each of the plurality of the distance measurements collected;

determine a value of an error parameter based on a normalized summation of average values of the measurement errors and the duration in time; and detect an error in a pose of the front hazard sensor based on the value of the error parameter meeting or exceeding a threshold; and output a signal based on the detected error in the pose, wherein the signal is communicated to one or more actuator units of the robotic system to stop the robotic system.

10. The robotic system of claim 9, wherein the processor is further configured to execute the computer readable instructions to determine, based on a computer readable map of an environment, locations along the route traveled by the robotic system where value of the error parameter is configured to increase due to objects in the environment; and omit errors for distance measurements which detect the objects based on the computer readable map.

11. The robotic system of claim 9, wherein the processor is further configured to execute the computer readable instructions to adjust the threshold or value of the error parameter based on predetermined objects within the environment, the predetermined objects configured to cause an increase in value of the error parameter value.

12. The robotic system of claim 9, wherein the signal is outputted to a device, the device configured to indicate detection of the error in the pose of the front hazard sensor.

* * * * *